United States Patent [19]
Rodgers

[11] 3,868,355
[45] Feb. 25, 1975

[54] FOAM SEPARATION OF GLUTEN AND STARCH

[75] Inventor: Nelson E. Rodgers, Deephaven, Minn.

[73] Assignee: The Pillsbury Company, Minneapolis, Minn.

[22] Filed: Dec. 26, 1972

[21] Appl. No.: 318,145

[52] U.S. Cl............... 260/112 G, 127/71, 426/148, 426/199, 426/385, 426/460, 426/463, 426/464, 426/484, 426/507
[51] Int. Cl. .............................................. A23j 1/12
[58] Field of Search ................................ 260/112 G

[56] References Cited
UNITED STATES PATENTS

| 994,497 | 6/1911 | Berrigan | 260/112 G |
|---|---|---|---|
| 2,434,874 | 1/1948 | Tucker et al. | 260/112 G |
| 3,053,666 | 9/1962 | Henika et al. | 99/90 |

FOREIGN PATENTS OR APPLICATIONS

| 763,291 | 12/1956 | Great Britain | 260/112 G |

*Primary Examiner*—Howard E. Schain
*Attorney, Agent, or Firm*—Michael D. Ellwein; James V. Harmon

[57] ABSTRACT

This process is used to separate starch and gluten components of wheat endosperm by foam filtration. An aqueous dispersion of starch, gluten protein, and wheat solubles having a solids content of from 4 percent to 26 percent and a pH of from 3.8 to 6.5, is provided preferably by hydroprocess extraction. A gas is incorporated into the dispersion to create a gas emulsion wherein the gas bubbles are predominantly less than 1000 μm in diameter. The gas bubbles maintain their spherical shape, even as they form a compacted foam layer containing a maze of capillary channels in which the gluten protein and some of the starch are entrapped. Most of the starch, wheat solubles, and water drain from the foam and form a bottom layer. Mobilizing the foam layer by gentle agitation aggregates the protein particles and reduces their mobility, while diffusion of gas from small to large bubbles enlarges the interstitial channels and increases mobility of the starch. Washing the mobilized foam with water, selectively elutes the starch granules into the bottom layer. The foam layer, containing gluten, is separated from the bottom layer and usually dried. The starch in the bottom layer is separated from the solubles, refined and dried.

22 Claims, 7 Drawing Figures

(FOAM SEPARATION OF GLUTEN PROTEIN AND STARCH FROM HYDROPROCESS ENDOSPERM)

Effect of pH and Age on Relative Volumes of Foamed Endosperm, Drained Foam and Drainate.

(METHOD OF SEPARATING STARCH AND GLUTEN FROM HYDROPROCESS ENDOSPERM)

(TWO-STAGE FOAM SEPARATION OF GLUTEN AND STARCH, USING A CENTRIFUGAL PUMP FOR FOAM GENERATION.)

FOAM SEPARATION OF GLUTEN AND STARCH

BACKGROUND OF THE INVENTION

The present invention relates to a foam process for separating gluten protein from starch.

A wheat kernel consists of three major components: the endosperm, the germ and the husk. The husk comprises the outer branny layers lying between and including the aleurone and pericarp tissues and envelopes the starchy endosperm (the primary source of starch and gluten protein) and the germ. Although the aleurone, a dense layer of protein-rich, non-starch cells, overlying the body of the starchy endosperm endospern is technically of endospermal origin, it will be considered as part of the husk herein. In terms of the total weight of the wheat kernel, the husk typically comprises about 14.5 percent, the endosperm about 83 percent and the germ about 2.5 percent.

During conventional dry milling, wheat is ground and the husk including the aleurone layer, and the germ are mechanically removed from the endosperm. The typical yield of white flour from a dry milling process is from 72 to 74 percent of the total weight of the wheat.

Commercially, separation of starch and gluten from flour is commonly effected by constituting flour into a dough or batter and mechanically consolidating the gluten into coherent masses from which starch can be elutriated with water. See for example, Knight, "The Chemistry of Wheat Starch and Gluten and Their Conversion Products" (1965). In this widely used dough-washing process, the concentration of flour solids initially ranges from 47 to 54 percent, depending on the type of flour. The solids concentration ranges from 31 to 51 percent in the initial dough stage of the batter process and later is reduced to 15 to 29 percent when the dough is dispersed to a batter.

Recently, a hydroprocessed wheat product and two processes for obtaining that wheat product have been developed. See the following patents and patent applications: Rodgers, et al., "Wheat Product", U.S. Pat. No. 3,832,472; Rodgers, et al., "Hydroprocessing of Wheat", and Durst, et al., U.S. Pat. No. 3,788,861, all of which are included by reference herein in their entirety. The hydroprocessed wheat product retains substantially none of the normal cellular structure of the endosperm and comprises wheat starch granules that are subsantially intact, ungelatinized, and unoccluded by gluten protein, and homogeneous, smoothly contoured gluten protein particles containing only minor amounts of occluded starch. The hydroprocessing methods, above disclosed, yield an aqueous dispersion of wheat product with a solids content of from about 4 to about 30 percent. This hydroprocessed wheat product, thus, is not well adapted to the conventional wet method of separating starch and gluten such as described above. Dry methods of separating starch and gluten (see Rozsa, et al., U.S. Pat. No. 3,077,408) are not feasible with the hydroprocessed wheat product because of the large amounts of water initially present in it.

SUMMARY OF THE INVENTION

The primary object of this invention is to devise a process for obtaining starch and gluten protein fractions from dilute aqueous dispersions of hydroprocessed wheat product.

Another object is to provide a process whereby gluten protein can be recovered in a foam which can be dried with minimum denaturation.

A further object is to provide a process whereby the starch granules can be recovered in intact, ungelatinized form with only a trace of gluten protein therein.

Yet another object is to provide a process whereby the soluble components of the wheat product can be recovered separately from the starch and gluten protein.

The above and other objects are attained by this process for separating an aqueous dispersion of hydroprocessed wheat endosperm into a starch fraction and a gluten protein fraction. An aqueous dispersion containing starch, gluten protein and wheat solubles from hydroprocess extraction of wheat, is provided having a solids content ranging from 4 to 26 percent and a pH of from 3.8 to 6.5. A non-toxic gas is injected into the aqueous dispersion to form a gas emulsion, wherein the diameters of the gas bubbles are predominantly less than 1,000 $\mu$m. The gas emulsion is allowed to separate into a top layer of foam comprising compacted, spherical bubbles, gluten protein and some starch granules and a bottom layer comprising starch suspended in an aqueous solution of wheat solubles. The foam layer is gently agitated to cause aggregation of the gluten protein particles and then washed while being gently agitated. During the simultaneous washing and agitating, the starch and wheat solubles are selectively elutriated from the top foam layer into the bottom layer, while the gluten protein is retained by the foam. The starch and gluten protein can be separated by removing the foam layer from the bottom layer along the foam-liquid interface. Various processing methods can be used to further purify and dry these components.

DESCRIPTION OF THE PREFERRED EMBODIMENTS

Figure 1:
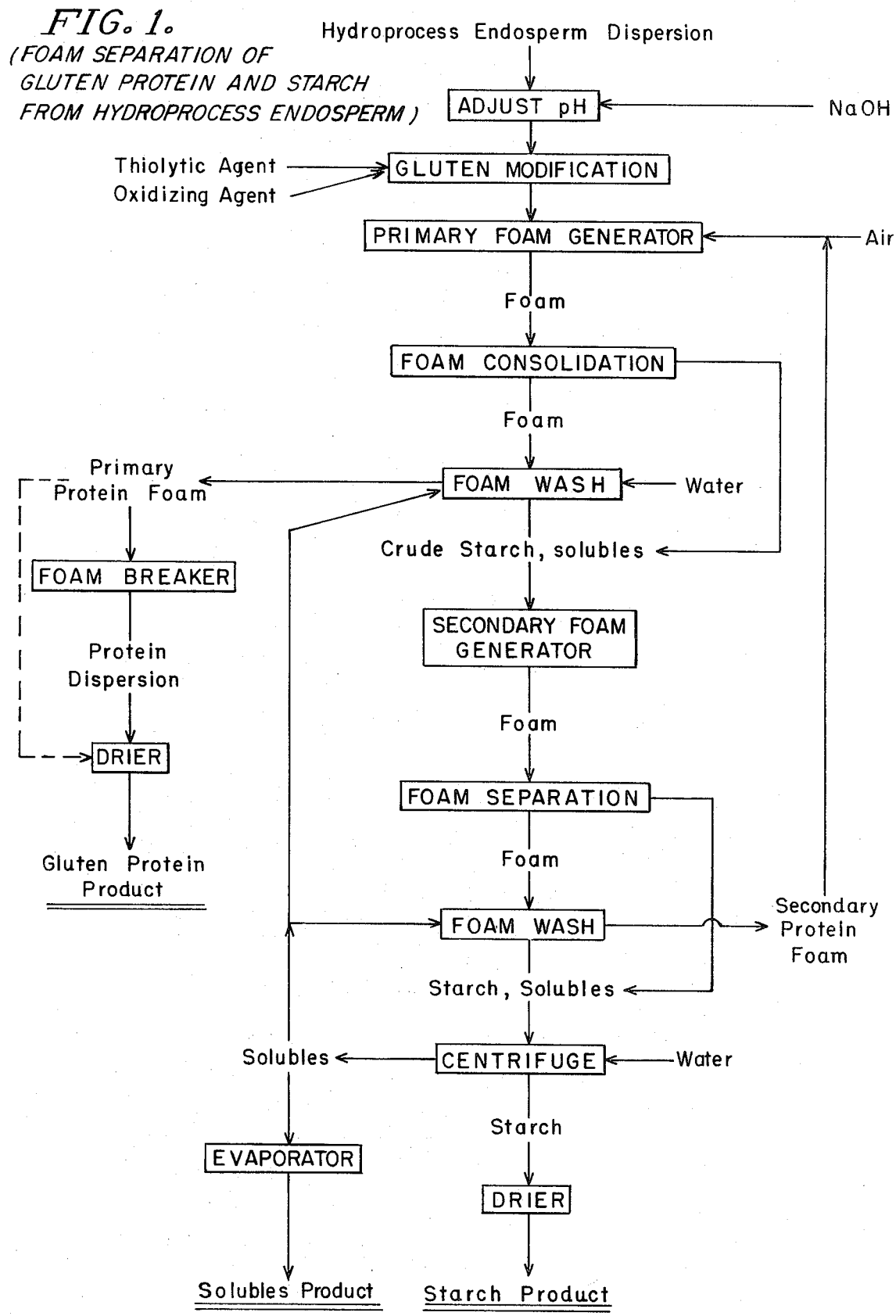
FIG. 1 is a schematic flow diagram of this foam separation process illustrating the essential steps of the process and some of the preferred embodiments thereof.

This process entails generation of an emulsion-like dispersion of gas in hydroprocessed endosperm. The bubbles in the gaseous emulsion rise and entrain starch and gluten particles to consolidate into a microporous foam layer, which constitutes the selective filtration medium in this process.

Frequently, the term "emulsion" is used to describe a dispersion of a liquid in another liquid in which it is immiscible. Emulsion is used here to define an exceptionally fine dispersion of gas in a liquid as a functional precursor to a foam layer, comprising compacted spherical bubbles with interstitial channels, as distinguished from a froth containing fused polyhedral gas cells.

Separation of starch granules from protein particles by selective filtration through a foam medium depends on a unique and evolving relation between the size of the starch and protein particles and the size of the capillary channels interstitial to the bubbles and, in consequence, the size of the bubbles. The dimensional complex of starch, protein and bubbles is a dynamic system in which the differentials in size change with time and induced movement. To a large extent, it is this evolution in size relations that effects a selective release of starch and solubles from gluten protein entrapped in the foam.

The size of the larger starch granules is the first limiting and fixed parameter of the system. Initially, most of the mass of the gluten is accounted for by protein particles substantially larger than starch granules, but filtrationwise, the differential is not great. However, the protein particles aggregate into larger particles as they are forced into turbulent contact by induced jostling of the bubble structure and are progressively impeded as they stream through the interstitial channels. At the same time the interstitial channels increase in size due to dissolution of the smaller bubbles in the population and diffusive transport of gas into larger bubbles. Furthermore, the interstitial channels constantly expand and contract due to gentle agitation of the foam layer. In effect, a channel is an interrupted succession of trap doors, which restrains the movement of larger particles and allows the smaller particles to slip through.

Thus, as the bubbles of a gaseous emulsion rise and consolidate into a foam layer, both starch and protein particles are swept into the compacting foam. As much as half or more of the starch is selectively released and settles into the underlying liquid layer as the foam drains. As the drained foam is mechanically worked, the protein particles increase in size by aggregation and their movement through the foam is impeded. At the same time with increase in bubble size, the mobility of starch through the interstitial channels increases. While in this condition, washing the foam with a spray of water selectively elutriates the starch while the gluten protein remains in the foam layer.

These dimensional relations and selective movement of particles can be readily discerned by microscopic measurement of the relative sizes of starch granules, protein particles and bubbles and by observation with a hand lens of movement of starch and differentially stained protein particles through foam in a transparent column.

Granules of wheat starch typically range between 1 and 35 $\mu$m in overall dimension. Although granules less than 15 $\mu$m comprise around 87 percent by number, about 93 percent by weight of the starch is distributed in granules between 15 and 35 $\mu$m.

Initially, the size of particles of gluten protein in the hydroprocess endosperm should be such that over 90 percent of the mass of protein exists in particles substantially larger than 35 $\mu$m; i.e., the size of the larger starch granules. Preferably, over 99 percent of the protein mass should be accounted in particles exceeding 35 $\mu$m to compensate for some reduction in size by attrition during generation of the gaseous emulsion. The incidence of particles larger than about 1000 $\mu$m should be negligible, since such large particles tend to escape entrainment in the swarm of bubbles as the gaseous emulsion separates into a foam layer. The gluten protein should be undenatured, so that the protein particles tend to associate and aggregate during mobilization of the foam.

In a typical hydroprocess endosperm containing about 12 percent solids, the protein particles initially averaged around 105 μm in random dimension in a range of 10 to 430 μm, wherein about 80 percent of the particles were between 14 and 196 μm (i.e., 10 to 90 percentile range). Attrition of the protein particles during foaming reduced the size appreciably. Thus, in the undisturbed consolidated foam layer, the particles averaged 53 μm in a range of 10 to 135 μm, wherein about 80 percent of the particles were between 16 and 90 μm. However, after the foam layer was mobilized by gentle agitation and washed with water, the particles averaged 150 μm in a range of 25 to 1,550 μm, with about 80 percent of the particles between 35 to 300 μm.

Although some of the protein particles may overlap the size range of starch granules, the distribution of size is such that nearly all of the mass of protein is accounted for in particles substantially larger than 35 μm starch granules. Thus, in this typical case, the proportion of the total mass of protein represented by particles over 35 μm was 99.9 percent in the endosperm, 97.9 percent in the undisturbed foam layer and 99.9 percent in the mobilized washed foam. The distribution of mass in particles larger than 70 μm (twice the size of starch granules) was 99.2, 71.7 and 99.9 percent, respectively; and, in particles larger than 140 μm, the distribution was 85.0, 0.0 and 99.6 percent, respectively. In the mobilized and washed foam, about 95 percent of the protein mass was in particles larger than 500 μm in random dimension, even though such particles represented only about 5 percent of the total population.

Generally, the bubbles in the gaseous emulsion, as initially generated, should be predominantly less than 1,000 μm in diameter. The size of the bubbles should be distributed so that, as the emulsion separates into a foam layer, the intermingling of various sized bubbles forms a filter medium with fine interstitial channels. Preferably, the bubbles should be predominantly less than 300 μm, as initially formed, to effect highly selective filtration of starch granules from particles of gluten protein. Although bubbles less than 40 to 50 μm may be formed, they probably have little significance in the initial emulsion, since they quickly disappear due to diffusion of gas into larger bubbles. Bubbles larger than 1,000 μm are generally undesirable in that they reduce the efficiency of the foam as a filtration medium. As noted later, they also constitute a low pressure gaseous sink which modifies the course of change in size of smaller bubbles in the rest of the population.

In a typical gas emulsion generated by vortex entrainment of air in an endosperm containing 11.7 percent solids, the bubbles ranged from 40 to 210 μm, distributed about a mean of 102 μm and a median of 92 μm with a 10 to 90 percentile range of 62 to 150 μm. About 90 percent of the total volume of the bubbles was contained in bubbles ranging between 88 and 210 μm.

The amount of gas emulsified in the endosperm should provide a swarm of bubbles sufficiently concentrated to sweep the protein particles from the endosperm dispersion into the layer of foam formed by the rising bubbles. Also, the amount of emulsified gas must be adequate to provide a foam layer with interstitial space sufficient to contain the protein particles and part of the starch initially entrained.

This requirement varies with the solids concentration in the endosperm and depends to some extent on the distribution of size of the protein particles. In general, useful separation of protein from starch can be obtained where the specific volume of the endosperm containing emulsified gas initially is between about 1.3 and about 2.0 ml/g of endosperm and the yield of separated foam layer is about 0.35 to 1.0 ml/g of endosperm. Generally, the yield of gluten protein and purity of starch is best where the yield of separated foam exceeds about 0.55 ml/g of endosperm. Although gas can be incorporated to effect specific volumes of 3.0 ml or more per gram of endosperm, such is generally unnecessary unless the protein particles in the endosperm are exceptionally small.

As the bubbles in the gas emulsion rise and compact into a foam layer, they characteristically remain spherical and do not coalesce extensively into a froth within the time of the process. Bubbles less than 1,000 $\mu$m tend to be quite rigid, due to the acute curvature and the character of the endosperm surfactant. As variously sized bubbles nestle together to form a matrix permeated by interstitial channels, the angle of contact is substantially zero; i.e., tangential. The bubbles are quite mobile with little tendency to mutually adhere. When jostled, they roll and bounce off one another. Protein and starch particles caught in the interstices are mobile and do not adhere to the bubbles, although protein particles may be squeezed flat between adjacent bubbles.

Due to the fine interstitial structure of the bubble matrix, capillary and viscous forces limit the extent of drainage of liquid. Coalescence of bubbles is restrained by the intervening layers of liquid and rigid sphericity of the bubbles.

These properties of fine bubbles and associated particles distinguish this foam filtration system from froth flotation processes. In froth flotation systems, such as used for purification of ores, hydrophobic particulate matter forms a finite angle of contact with the bubble and is drawn into and is immobilized in the interface between gas and liquid. Moreover, the bubbles are generally of sizes substantially larger than 1,000 $\mu$m which, upon flotation, drain and compact into fused polyhedral cells separated by thin liquid films or laminas. See A. W. Adamson, *Physical Chemistry of Surfaces*, Interscience Publishers (1960), pages 406–410 and 362–371; and G. L. Clark and G. G. Hawly, *The Encyclopedia of Chemistry*, Van Nostrand Reinhold, 2nd ed. (1966), pages 446–449. In contrast, the foam layer in the present process is characterized by relatively rigid spherical bubbles which compact into a matrix permeated by interstitial channels, wherein entrapped protein and starch particles are mobile and unadsorbed in the gas-liquid interface.

An evolution in distribution of bubble size during the process contributes importantly to selective filtration of gluten protein from starch. The pressure within a bubble due to surface tension varies inversely with the radius of the bubble, according to the relation $P = 4\gamma/r$, where $P$ is pressure, $\gamma$ is surface tension and $r$ is the radius. Thus, gas diffuses from a small bubble at relatively high pressure through the aqueous phase to a larger bubble at a lower pressure.

During initial fast drainage of water from the foam layer, the close packing and fine interstitial structure afforded by small bubbles prevents the protein particles and part of the starch from being swept through. As the foam is mobilized by gentle agitation, the protein is aggregated into larger particles. Concomitantly, the size of interstitial spaces increases accompanying disappearance of small bubbles, thereby releasing the remaining starch while the foam is washed. The protein particles are effectively retained in the foam layer.

The following describes the steps of this process more specifically in relation to the flow diagram in FIG. 1.

Providing The Aqueous Dispersion

In the first step of this process, an aqueous dispersion is provided which contains starch, gluten protein, and wheat solubles at pH between 3.8 and 6.5.

The aqueous dispersion is, a hydroprocessed wheat endosperm product as described in Rodgers, et al., "Wheat Product," Ser. No. 235,700, supra. In this product, the normal cellular structure of the endosperm is completely disrupted; the starch granules are intact, ungelatinized and unoccluded by gluten protein; and the gluten protein exists in homogeneous, smoothly contoured particles containing only minor amounts of occluded starch. The gluten protein substantially undenatured with respect to doughing function. Generally, at least 90 percent by weight of the gluten particles measure over 50 $\mu$m in random dimension. The starch and gluten protein are dispersed in an aqueous solution of wheat solubles. During the hydroprocessing of wheat to obtain this wheat endosperm product, the endosperm is dispersed in an aqueous medium, the starch granules are maintained in a substantially intact and ungelatinized form and the gluten protein is dispersed. During processing, the husks are also removed. These processing methods are more fully explained hereinafter.

The soluble fraction of the hydroprocessed endosperm acts as a foaming agent during this process. Although it has not been specifically identified, it is suspected that the foaming properties are derived from a polypeptide apparently obtained from the husk or germ during hydroprocess.

The hydroprocess wheat product can be obtained by at least two methods. The first method is described in detail in Rodgers, et al., "Hydroprocessing of Wheat," Ser. No. 154,532, supra. In that method, wheat is first steeped in an acidic steeping medium until the wheat has sorbed steeping medium equivalent to, preferably 63 to 71 percent by weight of the wheat. The wheat is then macerated to split the husk and expose the endosperm. The wheat components are dispersed in an aqueous medium while maintaining the pH at between 2.4 and 3.4. The husk and germ are then separated from the endosperm. The endosperm product is obtained as an aqueous dispersion generally containing from 4 to 30 percent by weight of solids. Preferably, the pH of the endosperm product is adjusted near the end of the process to a pH of from 4.5 to 6.5 to restore the glutenating properties of the gluten protein. The cellular structure of the endosperm is completely disrupted and the starch and protein particles are separately dispersed. The gluten protein is physically metamorphosed to particles that are homogeneous and smoothly contoured and ranging in size such that at least 90 percent of the protein is contained in particles over 50 µm in randomly measured dimension. Throughout this process, the starch granules are maintained in an intact and ungelatinized form and the gluten protein is dispersed and substantially undenatured with respect to doughing function.

The second method is described in detail in Durst, et al., U.S. Pat. No. 3,788,861, supra. In this process, the entire wheat kernel is ground in an aqueous medium at a temperature not over 104° F. The husk and bran are then separated from the mixture of endosperm and germ after which some of the water is removed. This wheat product is generally obtained at a pH between 5 and 7 and at solids concentrations ranging from about 4 to 35 percent. The cellular structure of the endosperm is disrupted and the starch and protein particles exist independently of each other. The starch granules are maintained in an intact ungelatinized form and the gluten protein is substantially undenatured with respect to doughing function.

Attempts to use conventional flour without additional foaming agents in this process have failed due to poor foam generation and lack of selective retention of gluten protein in the foam. The treatment of flour under simulated hydroprocess conditions did not activate foaming. It is thus inferred that the foamant is extracted from the husk and germ into the endosperm fraction during hydroprocessing.

The pH of the hydroprocessed endosperm is adjusted to between about pH 3.8 and 6.5, and preferably to between pH 4.2 and 5.0. Below about pH 3.8, extraction of gluten protein is inefficient because the protein is highly hydrated and fine particles of gluten fail to aggregate into particles large enough to be selectively retained in the foam. At pH levels above around pH 6.5, gluten progressively becomes soluble.

Although selective foam filtration of gluten and starch is quite effective between pH 4.2 and 6.0, operation between 4.2 and 5.0 is preferred where it is desired to suppress growth of microorganisms in the process. As noted later in the process, where foam carrying the gluten fraction is collapsed to form a liquid dispersion of gluten particles, the pH of the dispersion can be adjusted before drying to a level compatible with the intended use of the gluten. However, where the foam is spray-dried directly, it is necessary to conduct the foam separation at the pH desired in the dried product; e.g., generally in range pH 4.5 to 6.0. This is necessary since it is difficult to adjust the pH of a foam. Depending on the hydroprocess method, the pH can be adjusted with acids or bases, such as hydrochloric acid or sodium hydroxide.

The solids content of the aqueous dispersion should be between about 4 and about 26 percent. For economic operation and good performance, a solids concentration of 8 to 18 percent is preferred in this process. Where the solids concentration available from hydroprocess is higher than desired for foam extraction, the dispersion of wheat product can be diluted with water, or preferably, with the wheat solubles fraction discharged from the centrifuge downstream (see FIG. 1). Thus, with recycle of the aqueous solubles stream, dilution of the input dispersion does not increase evaporation requirements.

Operation at less than 4 percent solids is not economical because of size of equipment required. Although separation of starch and gluten can be effected at 26 percent solids, the process is marginally stable. As the concentration of solids is increased above 18 to 20 percent solids, the foaming capacity of the system and the ability of the foam to retain gluten particles selectively diminishes.

GLUTEN MODIFICATION

Pretreatment of the endosperm dispersion with certain oxidizing and reducing agents, singly or in combination, can be used to effect modification of the rheological properties and doughing function of the gluten product. These agents, sometimes referred to as dough or flour improvers, are believed to variously modify the structure of gluten through dissipation, formation and translocation of disulfide bonds which crosslink the peptide structure of gluten proteins. See Y. Pomeranz, *Wheat Chemistry and Technology*, American Association of Cereal Chemists (1971), pages 523–569, and Henika and Rodgers, U.S. Pat. No. 3,053,666 (1962).

Generally, and depending on the particular agent and phase of dough development, oxidizing agents tend to toughen and reduce the extensibility of gluten, whereas certain reducing agents tend to make gluten more pliable and extensible. The interactions of combinations of certain oxidizing and reducing agents with gluten are complex and, as shown by Henika and Rodgers (Cereal Chemistry, 42:397 (1965)), can be employed advantageously to modulate and synchronize various phases of dough development.

Some examples of oxidizing agents suitable for modifying gluten in the hydroprocessed endosperm include: potassium bromate, potassium iodate, potassium persulfate, hydrogen peroxide, acetone peroxide, azodicarbonamide, dihydro-L-ascorbic acid, chlorine dioxide and oxygen. Examples of suitable reducing agents include: sodium bisulfite, cysteine and glutathione and certain related thiolytic agents as described below. Such oxidizing and reducing agents are generally useful for modifying the properties of gluten in this process when used in concentrations in the range of about 10 to about 120 ppm of endosperm solids.

In addition and as distinguished from modification of functional properties of gluten, it has been found that treatment of the hydroprocessed endosperm with certain thiolytic agents, such as cysteine and monothioglycerol, prior to foaming significantly improves the yield of gluten protein and purity of the separated starch.

A thiolytic agent is defined for use herein as a compound having the ability to effect scission of disulfide bonds in proteins in the manner: $RSH + P-S-S-P \rightleftharpoons PSH + R-S-S-P$, where RSH is a thiolytic agent and $P-S-S-P$ is a protein wherein adjacent peptide chains of the same or different protein molecules are cross-linked by a disulfide bond, $-S-S-$. A thiolytic agent is further defined as a member of that group of compounds containing two to six linearly linked carbon atoms, bearing at least one substituent sulfhydryl group and at least one substituent selected from the group consisting of hydrogen, hydroxyl, carboxyl and amino. In this context, the terms sulfhydryl, thiol, and mercapto are used synonymously. In addition to this structural class of compounds, glutathione (γ-L-glutamyl-L-cysteinyl-glycine) is a suitable thiolytic agent in this process. The cysteinyl component of this tripeptide is identified with the above-described class of compounds.

Examples of the above-defined class of thiolytic agents include: cysteine (2-amino-3-mercaptopropanoic acid), α-monothioglycerol (3-mercapto-1,2-propanediole), ethyl mercaptan (ethanethiol), 2-mercaptoethanol, cysteamine (2-aminoethanethiol), thioglycollic acid, thiolacetic acid, thiolactic acid (2-mercaptopropionic acid), 3-mercaptopropionic acid, thiomalic acid, homocysteine (2-amino-4-mercaptobutyric acid), 1,4-dithioerythritol (erythro-2, 3-dihydroxy-1,4-dithiolbutane), 1,4-dithiothreitol (threo-2,3-dihydroxy-1, 4-dithiolbutane), and 1-thiosorbitol. Compounds of this class can also be used to modify the functional properties of gluten, as well as to improve the efficiency of the foam fractionation process.

Cysteine is particularly useful in this process, since it is officially recognized as an optional ingredient in bread and rolls. In addition to the D, L and DL stereoisomeric configurations of cysteine, the more soluble salts of cysteine can be used advantageously, such as the hydrochloride, sulfate, phosphate, and tartrate salts. As an article of commerce, L-cysteine hydrochloride monohydrate is particularly useful.

Treatment of the hydroprocess endosperm prior to foaming with thiolytic agents, such as L-cysteine HCl·$H_2O$ and monothioglycerol, has been observed to improve the yield of gluten protein up to 16 percent and to reduce the nitrogenous impurities in the refined starch by about 50 percent. Cysteine HCl·$H_2O$ has been found beneficial when used in concentrations from about 40 ppm to about 100 ppm of endosperm solids, corresponding to about 23 to 57 microequivalents of thio-group per 100 grams of endosperm solids. As a class, thiolytic agents are generally useful in this process in concentrations providing equivalent concentrations of reactive thio-group ranging from about 10 to about 75 microequivalents per 100 grams of endosperm solids.

Injecting Gas into the Endosperm Dispersion

A gas is incorporated into the aqueous endosperm with high shear agitation to create a gas emulsion (primary foam), wherein the bubbles are predominantly less than 1,000 μm and preferably less than 300 μm in diameter.

Any non-toxic gas can be used, although air is the most convenient. In some circumstances, it may be desirable to minimize oxidation of gluten by using an oxidatively inert gas, such as nitrogen or carbon dioxide. The secondary foam, originating downstream (FIG. 1), can be used wholly or in part as a source of gas in generating the gaseous emulsion of the primary foam. This recycle enables economical recovery of a small amount of protein escaping the primary separation and carried into the secondary foam.

The gas emulsion can be created by any means of mechanical dispersion imparting shear sufficient to create fine bubbles as described above. High shear dispersion can be affected by many devices, such as deep gas entraining vortices generated by high speed impellers, impellers peripherally injecting gas delivered through a hollow shaft, impellers impinging gas against circumferentially disposed stator blades and Waldhof-like circulation systems involving an impeller positioned at the base of a submerged draft tube. One effective device requires simply metering flows of gas and endosperm to a centrifugal pump, the gas being jetted directly into the eye of the pump. The liquid flow to the pump is limited so that the pump is operated in a starved condition. An Oaks mixer is an effective dispersing device. The distribution of bubble size can be controlled to some extent by maintaining the dispersing system under positive pressures up to around 30 psig.

Generally, the amount of gas entrained should yield a gas emulsion with a specific volume of about 1.3 to about 2.0 ml/g of endosperm dispersion. Preferably, the specific volume should be around 1.5 to 1.8 ml/g.

In the above methods for creating the gas emulsion, the entire body of endosperm is treated in the gas-dispersing device, either batchwise or in a continuous flow process. High shear dispersion of gas causes some reduction in size of protein particles which, to some extent, may limit complete entrainment of protein as the bubbles consolidate into a foam layer. This tendency can be minimized by an alternative procedure whereby gas is injected into only a small part of the endosperm and the gas bubbles so generated are allowed to permeate the entire body of endosperm.

In this method, endosperm is treated in a columnar vessel with a conical bottom. Endosperm is pumped recirculatively from the bottom of the vessel through the gas injector and returned to the vessel at a point only slightly above the bottom. The gas bubbles rise and escape from the recirculated region of the vessel to permeate the entire body of overlying endosperm. In this way, only a small portion of the endosperm is subjected to high shear agitation and attending degradation in size of protein particles. This method affords an additional advantage in that the amount of gas emulsion is not limited to that practically attainable by a single pass of endosperm through the gas injector. Thus, gas emulsions with specific volumes of 2 to 3 ml/g of endosperm can be generated. Emulsification of gas is not limited by the amount of foamant present in the recirculated portion of endosperm, since the surfactant activity of the endosperm is considerably greater than required by the process.

As thus described, this alternative method is limited to batch or semi-continuous operation, since there is no way to direct a downward flow of starch bearing liquid through the recirculative zone. The process can be made continuous by segregating the recirculative emulsification of gas to an adjacent vessel. A small part of the total continuous flow of endosperm is pumped into the recirculating emulsification and the remainder is directed to a point part way up in the columnar vessel. The gas emulsion in the recirculating vessel is pumped to a distributing ring in the columnar vessel at a point somewhat below the level at which the main body of endosperm enters the column. The downward flow of starch bearing liquid escapes into the quiescent zone at the bottom of the column, from which it is continuously removed. The protein-rich foam layer collecting at the top of the column is flowed to downstream processing.

A further modification of this alternative system of gas emulsification completely avoids exposing the gluten protein to reduction in particle size by dispersive shear. In this method, a part of the by-product solubles stream, emerging downstream in the process, is used as the medium for emulsifying the gas. In the above continuous version, a relatively small volume of solubles is pumped continuously into the recirculative gas emulsification and the endosperm is directed entirely to the columnar vessel where it is permeated by the gas emulsified in the solubles. This method has some disadvantage in that it entails reprocessing a small volume of recycled liquid. However, where exhaustive recovery of gluten protein and high purity starch is desired, it can be advantageous.

Consolidation of the Gas Emulsion into a Foam Layer

After the gas emulsion is formed, it is allowed to consolidate into a top foam layer, comprising a compacted mass of spherical bubbles with entrapped particles of gluten protein and some starch granules, and a bottom layer, consisting primarily of starch suspended in a solution of wheat solubles. The foam layer develops as a plastic, flowable stable mass, containing 30 to 40 percent protein, dry basis, i.e., two or more than three times the protein concentration in the endosperm.

The process of consolidation and the developed foam layer constitute, in effect, a dynamic filter wherein protein is selectively filtered from starch. It is dynamic in the sense that the filter medium is mobile during separation of the foam layer and that the bubbles in the foam layer can be individually mobilized in subsequent washing operations. This is distinguished from froth flotation processes, wherein the foam layer comprises fused polyhedral gas cells with little, if any, interstitial porosity. Due to the structure comprising fine bubbles and entrained protein, the foam layer is remarkably stable and remains functional for several hours longer than is necessary to complete the process.

Separation into a foam layer can be effected in several ways. However, some general aspects should be considered. During the initial phase of separation, when the bubble swarm is freely mobile, flow conditions should be relatively quiescent and non-turbulent to allow progressive entrainment of protein particles as the bubbles gradually consolidate into a foam layer. At various phases, and depending on the means of separation, the development of the foam layer can be viewed either as a flotation of bubbles or as a drainage of starch-carrying liquid through the interstitial structure evolving as the bubbles consolidate and compact. Concomitantly with or subsequent to the late compaction phase, the foamy mass should be agitated gently to jostle and mildly mobilize the structure on a microdimensional scale. This favors terminal drainage and promotes random contact between protein particles so that they aggregate into larger particles.

Some aggregation is desirable to reduce mobility of the gluten protein in the interstitial channels during the ensuing washing operation. Excessive aggregation to particles much over 1,000 μm is undesirable, because such heavy particles may tend to sink through the foam layer. Such gentle jostling of the foam structure can be induced deliberately by agitating blades moving slowly through the foam or simply by irregular compression and sliding of foam layers as it is pushed through the separating device.

Consolidation of the gas emulsion into a compacted layer of foam can be effected by quiescent rise of bubbles in columnar vessels, circular classification basins, long shallow troughs or horizontally positioned large tubes. The exact configurations of these devices depend on whether the operation is batch or continuous, whether mobilization of the foam layer to effect aggregation of protein particles is conducted in the same equipment and whether the equipment is designed to include a concomitant washing step.

Columnar vessels (FIG. 4) are well adapted to batch or semicontinuous operation wherein the steps of foam consolidation, aggregation of protein and washing to elutriate starch can be time sequenced in the same vessel. Mobilization of the foam to favor aggregation of protein can be accomplished by slowly rotating paddles located in the upper section of the column. Columns can be used to continuously form the foam layer and aggregate gluten protein, but preferably, the washing operation should be conducted on foam transferred to a second column. The downward movement of wash solutions introduced at the top of a column countercurrent to rising bubbles makes it somewhat difficult to establish a selectively retentive foam layer.

Columnar classifiers afford an additional advantage in batch or semi-continuous operation, in that a partial vacuum can be applied to the closed vessel to enhance rate of bubble rise by moderate expansion of the bubbles. The magnitude of this effect in speeding the operation is evident from Stokes law, wherein the velocity of buoyant rise is a function of the square of the radius of the bubble. Where a column is also used for aggregation of protein and washing, a slowly pulsed intermittent application of vacuum can mobilize and jostle the bubble structure in the layered foam and enhance rate of drainage. In the washing step, these effects can be further amplified by alternate application of both positive pressure and reduced pressure. The rate of change in pressure should be slow and uniform to allow equilibration of surfactant with the changing area of the gas-liquid interface. Otherwise, the interface may be unstable and adjacent bubbles may coalesce.

Figure 2:
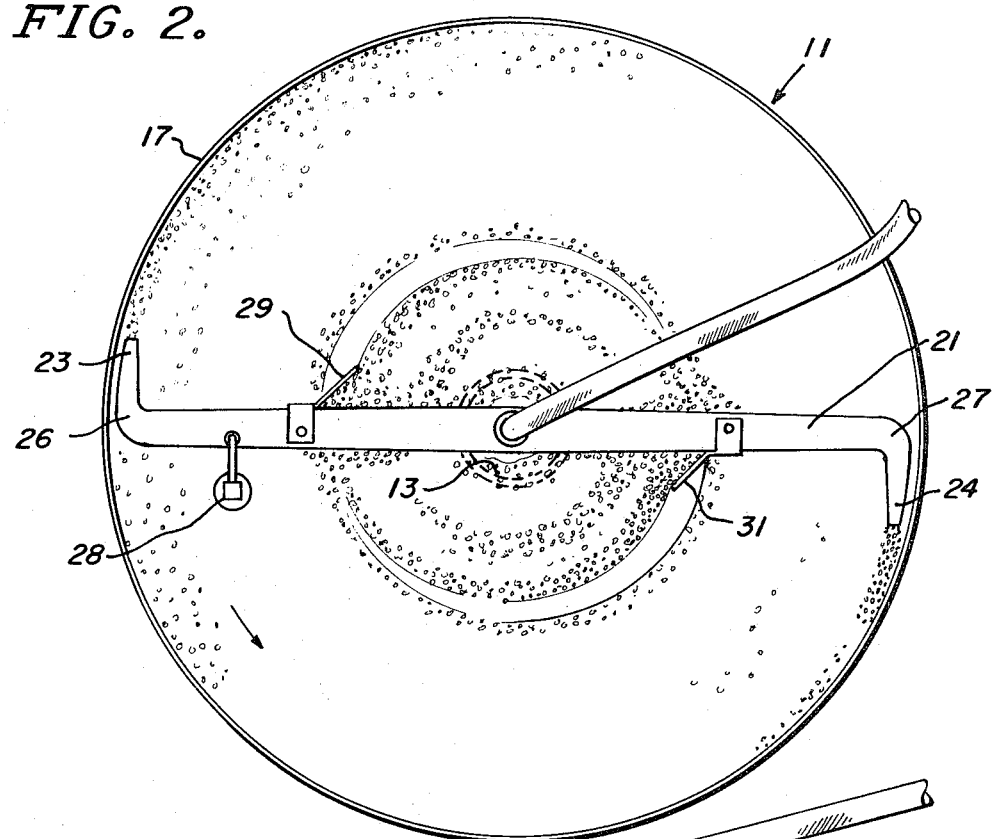
FIG. 2 is a top view of a basin classifier for consolidating, washing and separating foam.
Figure 3:
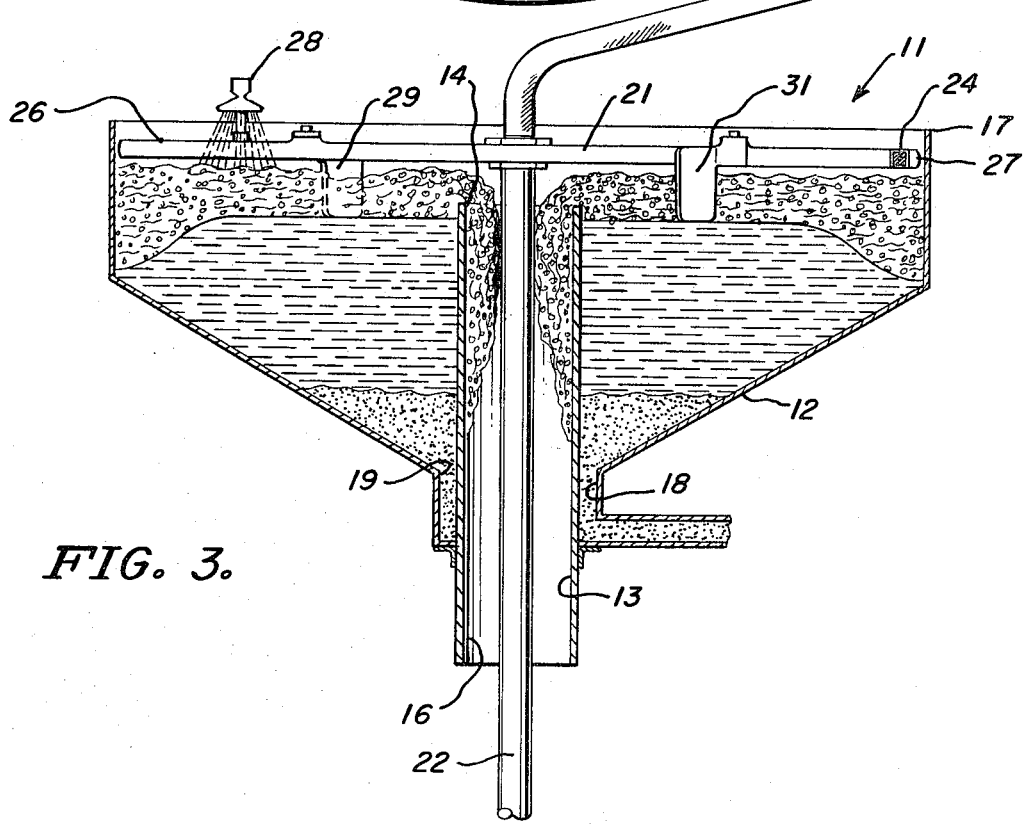
FIG. 3 is a cross-sectional view of the unit of FIG. 2 taken along line 3—3.

Circular classification basins, shallow troughs, and the like (FIGS. 2 and 3) are best adapted to continuous operation where foam consolidation, protein aggregation and washing, respectively, can be sequenced spatially. In these devices, the evolving foam layer floats and moves horizontally above an underlying liquid layer from an inlet to an outlet. In this movement, compressive distortion of the foam layer effects some mobilization of the foam with consequent aggregation of protein. However, aggregation can be enhanced by gentle agitation effected by slow moving paddles positioned in the spatial location of late foam consolidation and washing. Where a hemicylindrical trough or tube is used, a slowly rotating ribbon spiral or screw can be positioned to simultaneously mobilize the foam and to move starch, settled from the underlying liquid, to the discharge end.

Another method of consolidating the gas emulsion into a compact foam layer involves passing it over a fine screen. Surprisingly, a fine screen with pores substantially larger than most of the gas bubbles effectively retains the bubbles as the starchy liquid phase drains through the screen. Apparently, this is due to structural arching and wedging of the bubbles across the pores and the surface forces prevailing at the screen-air interface. Thus, a wire mesh screen with 250 μm openings retains nearly all of the bubble volume in a gas emulsion in which the mean diameter of the bubbles is around 100 μm. Some short-lived very small bubbles may pass the screen, but they constitute a negligible umn through distributor 42. Gas bubbles rise and entrain protein and some starch and consolidate into a foam layer above the transition interface 43. Starch suspended in a solution of wheat solubles, separating from the emulsion and draining from the foam layer, discharge from the bottom of the vessel through pump 44. Quieting baffles 45 restrain circulation below the distributor to enable quiescent rise of bubbles. Slowly rotating agitating paddles 46 gently mobilize the foam layer to promote rapid drainage and aggregation of protein particles.

The consolidated foam, emerging from the first column at 47, enters the washing column through distributor 48. A solution of wheat solubles, recycled from downstream process, enters the column at an intermediate level in the body of foam through distributor 49. Water is injected at a higher level through distributor 50. Slowly rotating paddles 51, gently agitate the foam as the solution percolates through the interstitial channels to selectively elutriate the remaining starch. Water, entering at a higher level, washes out the solubles. The down-flowing liquid tends to disperse the foam somewhat and a transition interface prevails at 52 below the agitated zone. Mobilization of the foam further aggregates the protein so that it is selectively retained in the rising body of foam. Solubles and suspended starch discharge through pump 53, where they are combined with the corresponding effluent from the first column for further processing 54. The protein-rich foam drains in the upper section of the column and discharges at 55.

Figure 4:
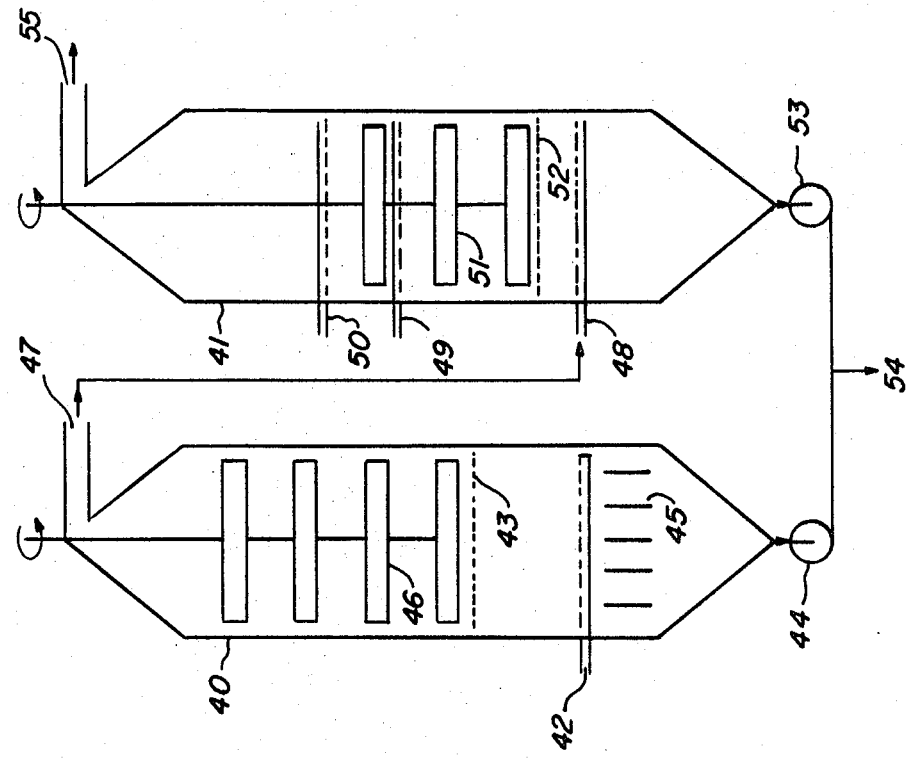
FIG. 4 is a line drawing of a system of columnar vessels used to consolidate, wash and separate foam containing protein from the underlying starch layer.

Alternatively, a single columnar vessel in the configuration of the first column 40 in FIG. 4 can be operated batch-wise to accomplish all of the functions of separation and consolidation of the foam layer, aggregation of protein and washing in a time sequence. In such case, provision is made for distributing wash water and wash solution near the top of the agitating zone in the same manner as in column 41. The vessel is progressively filled with gassed endosperm and allowed to consolidate into a foam layer and a bottom starch layer, after which the foam layer is agitated for a period to aggregate the gluten protein into readily retained larger particles and to effect complete drainage. The consolidated foam is then washed and drained. A further charge with gassed endosperm displaces the protein-bearing washed foam from the column and the cycle is repeated.

Batch operation is particularly advantageous in circumstances where the size of the protein particles in the gassed endosperm are somewhat small and may tend partially to escape with the starch under the less quiescent conditions of continuous flow. Two columns can be cycled alternately to avoid interruption of the continuous upstream and downstream operations.

Separating the Foam Layer from the Bottom Layer (10 layer of washed foam, separated from the bottom starchy layer as described above, is basis; plastic but flowable mass. The character of the foam will vary 80% with the concentration of solids in the endosperm and the extent of gasification and washing. Where the original aqueous dispersion contains 8 to 9 percent solids, the output of washed and drained foam typically is from 0.3 to 0.7 ml/g of the original dispersion, at a density from about 0.13 to 0.23 g/ml. The level of solids in the foam is about 14 percent (1 to 20 percent), containing about 14 percent (13.4 to 14.3 percent) Kjeldahl nitrogen, dry basis, i.e., equivalent (N × 5.7) to about 80% gluten protein.

Drying the Gluten Protein

The finely dispersed condition of gluten protein in the foam advantageously enables spray-drying the product with minimum denaturation. As conventionally manufactured, gluten is usually recovered in a coherent mass which must be broken up and dried in flash-type driers. In such process, recycle of the dried product at elevated temperature causes considerable denaturation of protein. Such gluten can be spray-dried after alkaline solubilization, but this also reduces functionality of the product.

The foam can be spray dried directly or, in some circumstances, it is advantageous to collapse the foam to an aqueous dispersion of protein prior to drying. Conversion to an aqueous dispersion reduces handling volume and enables further adjustment of pH to a desired level. Also properties of the gluten can be modified by adding oxidizing and thiolytic agents, as described above. Since the excess of surfactant has been washed from the foam, it can be readily collapsed by spraying through a pressure nozzle or by applying vacuum rapidly in a suitable chamber.

Also, the foam or the aqueous dispersion of protein can be dewatered more extensively by centrifuging or settling prior to drying. In addition to spray drying, flash driers, foam-mat driers and freeze driers can be used.

Purifying and Recovering the Starch

While nearly all of the particulate protein is removed in the primary foam, a small amount of fine particles passes into the bottom layer to contaminate the starch. Where a crude starch containing about 0.20 to 0.25 percent nitrogen is acceptable, starch can be recovered directly after eluting from the primary foam. Most of the crude starch can be refined to around 0.1 percent nitrogen by centrifugal washing, but this generally entails recovery of an appreciable amount of impure starch tailings. An effective alternative involves refoaming the starch-solubles underflow from the primary foam to extract all of the starch at less than 0.1 percent nitrogen.

The secondary foam is generated and washed in the same manner as the primary foam, except that only the recycled soluble stream is used as a wash medium (see FIG. 1). No water is used, since the washed foam is recycled as a source of gas to the primary foam generator.

The output of secondary separated and drained foam typically is from about 0.6 to 1.2 ml/g of original endosperm dispersion, with a density after washing of from about 0.06 to 0.15 g/ml. The concentration of solids is generally from about 0.8 to 1.9 percent with a nitrogen content of from 9.2 to 14.5 percent, dry basis.

In processing some types of wheat, traces of particulate protein escape the secondary foam. To ensure consistent purity of starch, it is advisable to pass the starch effluent through a 100 to 300 $\mu$m screen (not shown in FIG. 1).

The underflow effluent from the secondary foam separation is centrifuged with a wash cycle to separate starch from the accompanying solution of wheat solubles and traces of micro-particulate protein.

fraction of the total volume and the loss does not impair retention of protein.

As noted later in the examples, simple basin screens can be used advantageously in experimental work on batch processing. However, the amount of endosperm that can be processed batchwise on a given area of stationary screen is limited because of a tendency of gluten to clog the openings. Vibrating screens can be operated for long periods without fouling in a continuous process, but the capacity of such screens is somewhat limited for large scale operation.

A screen in the form of a large, slowly rotated cylindrical reel is well suited to sustained continuous drainage of water from the gas emulsion. The reel is positioned horizontally or with a slight tilt downward from the input to output ends. The input end of the reel is fitted with an annular weir-like cavity to dissipate the inrush velocity of the input feed which overflows into the screen section. A basin under the reel collects the starchy drainage. Applicable screening media include wire mesh, plastic mesh or cloth, perforated metal or plastic and bar-slot screens. Preferably, a plastic screen, on which gluten has little tendency to adhere, should be used at the input section of the reel, where the self-cleansing action is least effective. The effective openings of the screen should be generally between 100 and 300 μm.

As the gas emulsion is introduced into the reel, a drainage pool forms at the input end. The starchy liquid fraction drains through the screen and, as the reel rotates, liquid carried upwardly on the screen drains back and flushes any gluten particles caught in the screen. As the gas emulsion moves through the reel, it is progressively dewatered and develops a compacted plastic consistency. The plastic mass tends to climb with the elevating side of the screen but slips and falls backward. This action tends to wipe the screen clean and the mobilization is quite effective in inducing terminal drainage and in favoring aggregation of protein. The consolidated foam can be washed in succession with recycled solubles and water in the distal section of the reel, from which the gluten-rich foam is discharged for further processing.

Various centrifugal devices can also be used to rapidly consolidate the gas emulsion into a washable foam. However, considerable care must be taken to maintain an appropriate balance in the relative movement of the bubble, starch, protein and solution phases in space and time as governed by their inertial properties. Relatively low or moderate centrifugal force should be used and surface shear should be minimized to avoid destabilizing the gas emulsion.

Washing the Foam Layer

The foam layer obtained above is washed while it is gently agitated to elute starch and wheat solubles selectively into the bottom layer while retaining the gluten protein in the foam layer. It is essential to agitate or otherwise mobilize the capillary structure of the foam while washing. Washing the foam with a liquid spray without agitation effects relatively little further purification of protein. However, when the foam is mobilized by gentle agitation, micro-channels are transiently formed, enabling a percolating wash liquid to carry the starch away without dislodging the protein from the interstitial structure. As the foam is agitated with progressive removal of starch, the protein particles tend to coalesce and become firmly entrenched in the foam. As indicated previously, it is desirable to mobilize the foam to cause some aggregation of protein particles prior to washing to minimize loss of protein during the initial stages of washing. However, the total effect should not create aggregates much larger than 1000 μm, since such large particles may tend to sink through the foam.

Where a gluten concentrate free of wheat solubles is desired, water is used for washing. However, to minimize evaporation cost, it is economical to wash the foam first with the by-product solubles stream (FIG. 1) and to conclude the wash with a relatively small amount of water. The wash liquid should be dispersed uniformly over the foam by a spray or suitable distributor, since the foam layer is not subjected to much overall mixing. The amount of wash liquid used can vary widely, depending on the purity of gluten and yield of starch desired. In general, it may range from 1.0 to 6 parts of liquid by weight per part of endosperm solids from which the foam was derived. Usually, 2 to 6 parts of wash liquid yield a gluten product containing 75 to 85 percent protein, dry basis.

As indicated in the preceding section, the washing step can be conducted integrally in the same equipment used to consolidate the gas emulsion into a foam layer or it can be applied separately, the options depending on the particular configuration of equipment and whether the operation is batch or continuous. As with foam consolidation, mobilization of the foam layer can be effected by paddles or rods sweeping slowly through the foam or compressive jostling of the foam as it is pushed through the system. Although some general mixing of the foam may occur, the effect sought in repetitively distorting the capillary channels is on a micro-dimensional scale.

Several systems for integrating separation of the foam layer and washing have been generally mentioned above. The following describes two representative systems in more detail.

One of the preferred devices is a basin classifier (FIGS. 2 and 3), comprising a circular basin 11, the bottom 12 of which slopes downwardly toward the center. An outlet tube 13, open on both ends 14, 16, extends vertically through the center of basin 11. The top end 14 of the tube 13 is positioned below the top of outer edge 17 of the basin 11 and slightly above the normal height of the bottom starch layer in the basin 11. A second outlet tube 18 is concentrically disposed about the first tube 13. Its top end 19 communicates with the bottom 12 of the basin 11. A horizontally rotatable arm 21, centrally affixed to a shaft 22, extends over the basin 11 to proximate its outer edge 17. Liquid feed inlets 23, 24 are disposed on the outer ends 26, 27 of the arm 21 and feed the gas emulsion into the basin 11. Disposed inwardly of the inlets 23, 24 is at least one liquid spray nozzle 28 for washing the foam layer. Paddles 29, 31, also mounted on the arm 21, gently agitate or mull the foam layer while moving it toward the outlet tube 13. The bottom aqueous layer of starch and wheat solubles drains from the second outlet tube 18.

FIG. 4 shows a system of columnar vessels, wherein the gas emulsion is separated into a foam layer and the protein is aggregated in the first column 40. Then, the consolidated foam is transferred to a second column 41, where it is washed and thoroughly drained. Endosperm from the emulsion generator enters the first col- The refined starch is dried by conventional means. Depending on prior conditions of process and extent of washing, starch containing less than 0.5 percent nitrogen can be obtained.

Recovering the Solubles

The liquid stream from the centrifuge is a solution of soluble wheat components containing traces of small starch grains. As shown in FIG. 1, this stream is used as the principal washing fluid in partitioning starch from protein in the primary and secondary foams. A portion, corresponding to the combined inputs of water in the aqueous dispersion of endosperm and wash water can be continuously withdrawn from the circulating loop, concentrated by evaporation and, if desired, dried.

This product is a nutritious concentrate of soluble components of wheat, including vitamins, proteins and minerals useful as an adjuvant in foods, feedstuffs and fermentation media. It is noteworthy particularly as a concentrate of an extremely active foaming agent. Only a small part of the surfactant capacity of the endosperm extract is expended in the foam separation process. This product has potential as an ingredient in whipped dessert toppings, confections, industrial foam separations and foam-drying processes.

The following examples are illustrative of the invention:

EXAMPLE I

Figure 5:
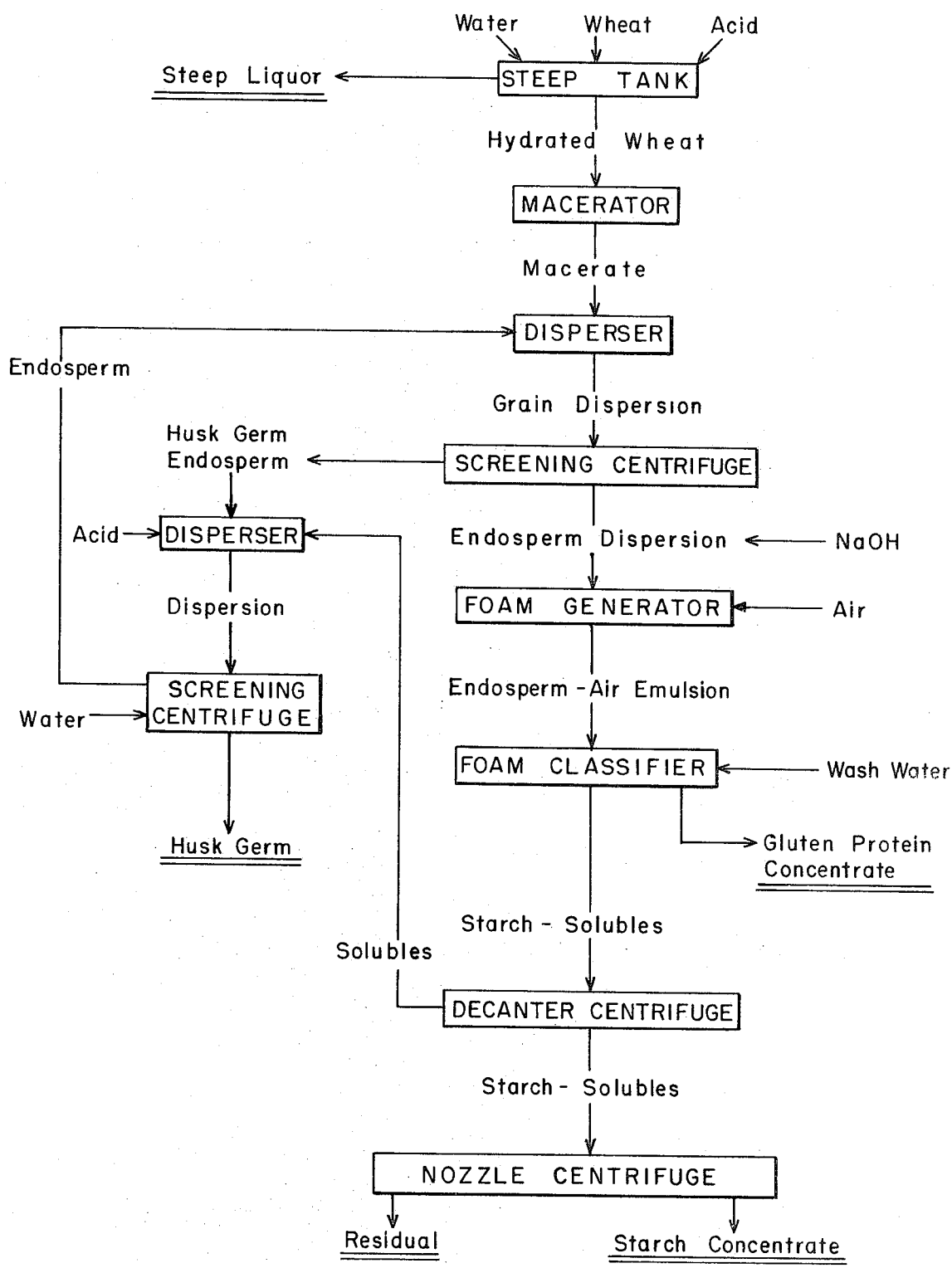
FIG. 5 is a schematic flow diagram of this foam separation process illustrating a preferred method of obtaining hydroprocessed endosperm.

Endosperm was extracted from a high protein dark northern spring wheat by a hydroprocess. A gluten protein concentrate was then separated from the endosperm by single-stage foaming, after which a crude starch was separated centrifugally from the suspension of starch and solubles drained and washed from the foam. The process is outlined in FIG. 5.

One thousand pounds of wheat were steeped batchwise in 1,600 pounds of 190 millinormal hydrochloric acid for 16 hours at 40° C. After draining the steep solution at pH 1.8 from the hydrated grain, the drained grain containing 54 percent solids was macerated in a Moyno pump at 3.8 pounds per minute. Maceration split the husk and exposed the endosperm as a plastic mass with minimum disruption of husk and germ tissues and without working the endosperm into a glutenous state. The pH of the macerate diluted with an equal weight of distilled water was 3.0.

The macerated grain was delivered continuously to a dispersor, wherein the grain was dispersed by hydraulic shear in a recycled liquid stream to about 20 percent solids. The pH of the dispersion was maintained at 3.0 by addition of acid to the origin of the recycled diluting stream. The dispersor comprised a hydraulic loop consisting of a reservoir through which the dispersion was recirculated with a centrifugal pump and continuously discharged. The weight ratio of throughput flow per minute to contained capacity of the dispersing loop was about 0.03. The hydraulic shear, imparted by the intense recirculation, disengaged the endosperm from substantially intact husk and germ tissues and disrupted the cellular structure of the endosperm into a dispersion of discrete and substantially unassociated starch granules and particles of gluten protein.

The discharge of dispersed grain was passed to a Mercone scroll-type screening centrifuge where the husk and germ fraction was separated from the stream of dispersed endosperm. The screening centrifuge was equipped with a screen having openings of 254 $\mu$m.

The husk-germ fraction, containing a small amount of occluded and incompletely disengaged endosperm, was delivered to a second dispersor. Therein, it was redispersed in a recycled liquid, originating from downstream in the starch and gluten extraction and containing about 2.5 percent soluble solids. The dispersion was discharged into a second screening centrifuge (254 $\mu$m screen), where the husk and germ, washed with water, was separated at about 35 percent solids from the dispersion of disengaged endosperm. The dilute stream of endosperm was recycled as the diluting medium in the first stage dispersor, as mentioned above.

The endosperm dispersion discharged from the first screening centrifuge was substantially free of husk and germ tissue and contained about 18 percent solids, including a small proportion of solubles. At this point, the yield of endosperm was about 83 percent of the input of grain solids and the protein nitrogen accounted for 81 percent of the wheat nitrogen. The yield of solids in the steep liquor and the husk and germ fraction were about 2 and 15 percent of the grain solids, respectively.

The endosperm dispersion at pH 3.0 was adjusted to pH 4.0 in transit to the foam generator by in-line injection of 0.7 percent solution of sodium hydroxide. The foam generator was an Oakes-type mixer in which a pressure of 40 psig was maintained by an outlet valve discharging to atmospheric pressure. Air was introduced to the mixer at a rate of 0.4 ml per gram of endosperm dispersion.

The endosperm, containing emulsified air, was pumped to two basin-type foam classifiers arranged in parallel. The configuration of the classifiers was similar to that described in FIGS. 2 and 3, consisting of a conical vessel 4 feet in diameter and 15 inches deep with a 6-inch vertical side wall and with centrally positioned standpipe for discharging gluten through the bottom apex of the cone. The solubles-starch suspension discharged through a vented annulus arranged concentrically to the standpipe at the bottom of the cone.

The foamed endosperm was introduced at the surface periphery of the vessel through a distributing arm rotated axially above the center of the cone. Baffles suspended from the rotating distributor arm and penetrating the central region of consolidated foam propelled the foam in a spiral path to the central standpipe. As the dispersion moved toward the center of the classifier, the air emulsion progressively consolidated into a viscoelastic foam layer about 3 inches deep, entrapping the microdisperse gluten protein and part of the starch. Water sprays, positioned above the central area of consolidated foam, eluted residual starch and solubles from the capillary interstices mobilized by the gentle shear imparted by the spiral circulation. The washed foam, rich in protein, discharged by overflow into the central standpipe.

The foam-protein concentrate at about 20 percent solids was collected in a vacuum vessel where the foam collapsed to a liquid dispersion suitable for spray or flash drying.

The starch suspended in endosperm solubles, underflowing from the foam layer, was delivered to a decanter centrifuge to separate a portion of the soluble fraction therefrom. This liquid fraction was recycled as the diluting medium in the second stage dispersor in the upstream extraction of endosperm. The underflowing starch suspension was separated by a nozzle-bowl centrifuge into a concentrate of crude large granule starch at 60 percent solids and a residual fraction containing solubles and small granule starch. Both of these starch fractions, if desired, can be further refined to remove solubles and traces of particulate protein and fiber.

The relative yields and nitrogen compositions of the gluten protein concentrate, crude starch concentrate and residual fraction are summarized in Table 1.

TABLE 1

Yield and Composition of Products From
Foam Extraction of Hydroprocess Endosperm

| Feedstocks and Products | Solids Yield* % | Nitrogen Yield* % | Nitrogen Concentration Dry Basis % |
|---|---|---|---|
| Wheat | — | — | 3.05 |
| Endosperm | — | — | 3.00 |
| Protein Concentrate | 20 | 87 | 13.2 |
| Starch Concentrate | 62 | 3.7 | 0.18 |
| Residual | 18 | 9.3 | 1.58 |

*Percent of solids or nitrogen in total products recovered

EXAMPLE II

The following laboratory experiment illustrates the effect of pH on selective retention of protein by an unwashed emulsion-type foam in a batch process for concentrating gluten protein.

An endosperm dispersion, containing 4.07 percent solids at pH 3.0, was prepared by hydroprocessing a blend of hard red winter wheats. 1,700 gram batches of endosperm dispersion were adjusted with sodium hydroxide to varied pH between 3.0 and 5.8, as shown in Table 2.

An emulsion-type foam was generated in each batch by vortex aeration in a four-liter graduated beaker 153 mm. in diameter. The endosperm dispersion at a liquid depth of 91 mm. was agitated with an impeller, positioned 25 mm. above the bottom of the beaker, at 2,000 rpm. for 5.0 minutes. The impeller was in the form of three flat, narrow radial arms to which 19 × 21 mm. blades were attached vertically and tangentially to the perimeter of rotation. The tangential position of the blades was such that, when rotated counterclockwise, liquid was pushed outwardly. Air drawn into the vortex was dispersed by rotational shear into bubbles less than 1,000 μm in diameter and predominantly less than 300 μm, as viewed with a 7X magnifier.

Upon resting, the aerated endosperms appeared as milk-white emulsions of uniformly dispersed air bubbles. Gradually, the air bubbles rose to form a consolidated layer of foam above a liquid layer containing suspended matter (drainate). At pH levels below 3.8, particulate matter settling from the drainate tended to be loosely consolidated and tinged with tan-colored gluten. At pH 3.8 and particularly at pH 4.2 and above, the sediment was starch-white and formed a firmly compact layer.

The foamed endosperms were held for 90 minutes, during which a series of measurements were made on volume of separated foam and drainate. The foam layer was then skimmed from the underlying drainate, weighed and freeze dried.

The supernatant liquid in the drainate was carefully separated from the sedimented particulate fraction by vacuum aspiration. The starchy sediment was suspended in 320 ml. of distilled water, screened through a 300 μm sieve and resettled for 18 hours at 3° C. A small amount of glutenous material collected on the

TABLE 2

Effect of pH on Retention of Protein in Statically
Drained Foam and Characteristics of Endosperm Fractions

| | Endosperm pH | | | | | |
|---|---|---|---|---|---|---|
| | 3.0 % | 3.4 % | 3.8 % | 4.2 % | 5.0 % | 5.8 % |
| Process Solids Concentration | | | | | | |
| Endosperm | 4.07 | 4.07 | 4.07 | 4.07 | 4.07 | 4.07 |
| Protein Concentrate | 13.3 | 14.7 | 17.1 | 17.0 | 18.3 | 18.7 |
| Starch Concentrate | 36.7 | 42.8 | 44.5 | 44.6 | 49.1 | 55.4 |
| Residual[1] | 0.70 | 0.54 | 0.72 | 0.40 | 0.43 | 0.43 |
| Solids Yield[2] | | | | | | |
| Endosperm | 80.1 | 79.8 | 79.8 | 80.1 | 79.8 | 80.1 |
| Protein Concentrate | 13.7 | 19.4 | 26.1 | 34.3 | 35.6 | 31.9 |
| Starch Concentrate | 65.3 | 68.8 | 50.6 | 52.5 | 50.9 | 54.8 |
| Residual | 17.8 | 14.3 | 18.5 | 10.2 | 11.2 | 11.2 |
| Total Fractions | 96.8 | 102.5 | 95.2 | 97.0 | 97.7 | 97.9 |
| Nitrogen Yield[2] | | | | | | |
| Endosperm | 86.8 | 76.1 | 76.1 | 86.8 | 76.1 | 86.8 |
| Protein Concentrate | 11.5 | 19.8 | 54.3 | 66.8 | 75.7 | 68.2 |
| Starch Concentrate | 21.7 | 33.0 | 5.83 | 2.60 | 1.81 | 2.20 |
| Residual | 63.8 | 38.1 | 29.0 | 20.3 | 15.2 | 19.8 |
| Total Fractions | 97.0 | 90.9 | 89.1 | 89.7 | 92.7 | 90.2 |
| Nitrogen Concentration, dry basis | | | | | | |
| Endosperm ($N_e$) | 2.89 | 2.55 | 2.55 | 2.89 | 2.55 | 2.89 |
| Protein Concentrate ($N_p$) | 2.43 | 2.60 | 5.31 | 5.64 | 5.43 | 6.20 |
| Ratio $N_p:N_e$ | 0.84 | 1.02 | 2.08 | 1.95 | 2.13 | 2.15 |
| Starch Concentrate | 0.96 | 1.22 | 0.30 | 0.14 | 0.09 | 0.11 |
| Residual | 10.3 | 7.03 | 4.02 | 5.74 | 3.48 | 5.11 |
| Lipid Concentration, dry basis | | | | | | |
| Protein Concentrate | 0.77 | 0.84 | 1.89 | 1.70 | 1.63 | 2.02 |
| Starch Concentrate | 0.31 | 0.50 | 0.06 | 0.01 | 0.02 | 0.01 |

[1]Solubles with some slow-settling colloids.
[2]% of endosperm solids of nitrogen, except endosperm expressed as % of grain solids or nitrogen.

screen was combined with the above foam fraction. The wash water overlying the washed sediment fraction was carefully separated by aspiration and combined with the above drainate supernatant.

The undried fractions thus derived are referred to in the accompanying tables and figures as follows: Protein concentrate = drained foam; starch concentrate = washed sediment from drainate; residual = drainate supernatant plus wash water from drainate sediment. Oven solids, Kjeldahl nitrogen and lipid by chloroform extraction were determined on these endosperm fractions.

It is seen in Table 2 that little or no preferential extraction of protein into the foam layer occurred at pH 3.0 and 3.4, but extraction increased sharply between pH 3.4 and 3.8. Both yield and purity of the protein concentrate increased through at least pH 4.2. While appreciable improvement in yield and purity between pH 4.2 and 5.8 is indicated, the significance of the minor inflections in the data in this range is debatable. Retention of protein in the foam fraction would diminish above about pH 6.2 to 6.5, due to partial solubilization. The inverse of these relations is seen in the remarkable purity of the starch concentrate with respect to nitrogenous and lipid impurities obtained between pH 4.2 and 5.8. Since starch constitutes about 74 percent of the endosperm solids in this type of wheat, the extraction of relatively pure starch was around 55 to 59 percent of the total in this pH range.

Figure 6:
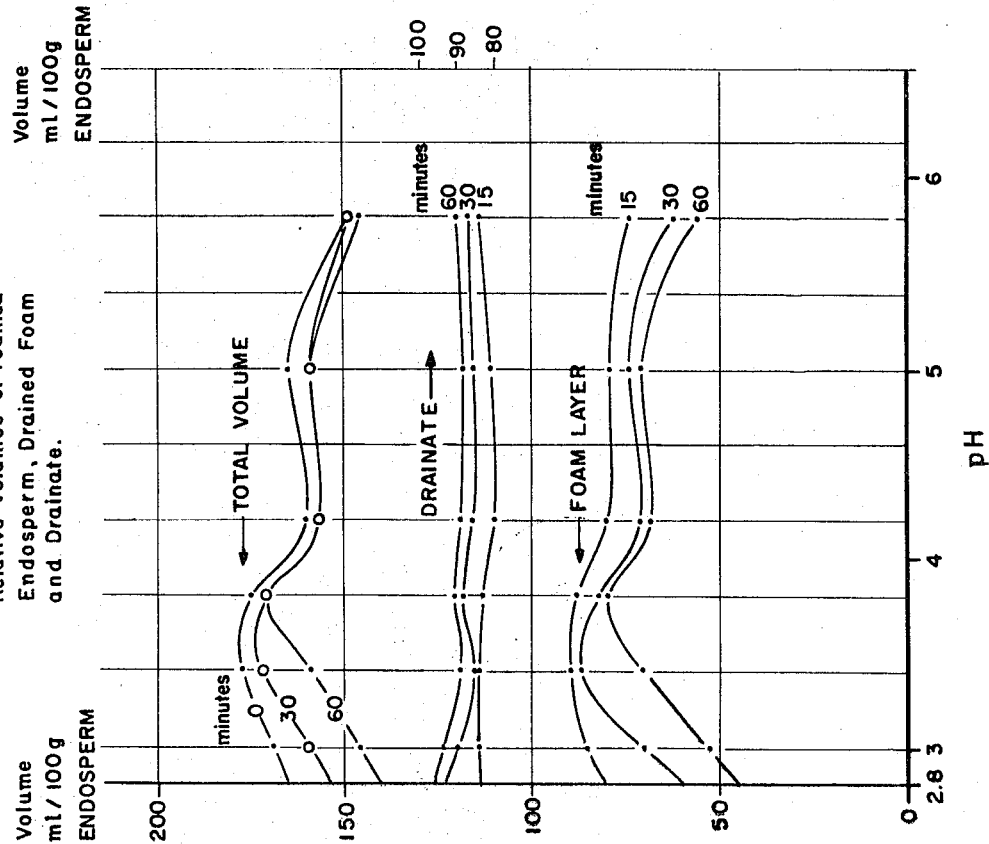
FIG. 6 is a graph illustrating the effect of pH and age on relative volumes of foamed endosperm, drained foam, and drainate.

Some characteristics of the emulsion-type foam are shown in FIG. 6. The initial specific volume of the dispersed emulsion ranged from 1.48 ml/g at pH 5.8 to a maximum of 1.77 at pH 3.4. Most of the foam separation and drainage occurred in 15 minutes, with relatively minor changes in volume of drainate and foam layer continuing through 60 minutes.

It is notable that between pH 3.8 and 5.8 the total volume of the system remained relatively unchanged during the period of separation of foam and drainate. This indicates that nearly all of the dispersed air was retained and that shrinkage of the foam layer was due to consolidation and close packing of the bubble structure. Below pH 3.8, the foam structure was somewhat less stable, as indicated by an appreciable shrinkage in total volume.

Microscopic examination of the foam obtained at pH 5.8 revealed a structure of closely compacted bubbles, most of which were less than 200 $\mu$m in diameter. The bubbles were spherical and in tangential contact with one another, forming a maze of connecting interstitial channels. The interstitial spaces were filled with starch granules and particles of gluten protein generally larger than the starch granules. The protein particles were homogeneously structured and contained very little occluded starch. Gentle compression of the cover slip to jostle the bubbles caused the starch granules to stream freely with the interstitial liquid. On the other hand, jostling the structure caused protein particles to aggregate and fuse into larger particles with consequent decrease in mobility. As noted in later examples, this selective immobilization of gluten protein contributes importantly, where the process is extended to further purification of protein by washing the foam.

Although the bubbles were closely compacted, there was no tendency to fuse or form a froth with polyhedral cells. The protein particles were free and showed no tendency to associate firmly with the bubbles, such as in the formation of an adsorption complex on the bubble surface. This clearly identifies the emulsion foam system as a selective filtration medium, as distinguished from familiar froth flotation refining systems where the refined material tends to adsorb on the interfaces of the generally polyhedral cell structure of a froth.

EXAMPLE III

This laboratory experiment demonstrates: (1) how washing a primary foam, in which gluten protein has been initially segregated, greatly improves the purity of the protein; (2) how secondary foaming of the drainate from the primary foam improves the yield of protein and purity of the starch product; and (3) the beneficial effect of certain thiol compounds in improving extraction of protein and purity of starch.

Four batches of endosperm hydroprocessed from a mixture of hard red winter and spring wheats, containing about 1,500 grams each at 8.7 percent solids concentration, were variously treated with sodium bisulfite, $\alpha$-monothioglycerol (3-mercapto-1,2-propanediol) and cysteine HCl.H$_2$O, as indicated in Table 3. These agents at concentrations equivalent to 45.6 micromoles per 100 grams of endosperm solids, were compared with an untreated control.

TABLE 3

Comparison of Effects of Sodium Bisulfite, Monothioglycerol and Cysteine on Yield and Composition of Endosperm Fractions from Two-Stage Foam Extraction

| Thiolytic Agent[1] | Control | Na bisulfite | Monothioglycerol | Cysteine-HCl.H$_2$O |
|---|---|---|---|---|
|  |  | 42 ppm | 54 ppm | 80 ppm |
| Process |  |  |  |  |
| Endosperm solids concentration (%) | 8.69 | 8.71 | 8.71 | 8.69 |
| Primary washed foam solids conc. (%) | 15.6 | 13.3 | 12.3 | 13.4 |
| Secondary washed foam solids (%) | 1.2 | 1.2 | 1.0 | 1.1 |
| Primary drained foam volume (ml/gf)[2] | 0.49 | 0.57 | 0.82 | 0.90 |
| Primary washed foam volume (ml/gf)[2] | 0.29 | 0.40 | 0.65 | 0.63 |
| Secondary drained foam volume (ml/gf)[2] | 0.64 | 0.69 | 0.99 | 1.05 |
| Secondary washed foam volume (ml/gf)[2] | 0.38 | 0.46 | 0.71 | 0.74 |
| Primary washed foam density (g/ml) | 0.22 | 0.20 | 0.15 | 0.13 |
| Secondary washed foam density (g/ml) | 0.12 | 0.08 | 0.07 | 0.06 |
| NaOH/100 g solids to pH 5.8 (meq) | 12.9 | 12.1 | 12.3 | 12.8 |
| Solids Yield[3] |  |  |  |  |
| Endosperm (%) | 77.6 | 78.0 | 78.0 | 77.6 |
| Primary protein concentrate (%) | 11.5 | 12.2 | 13.5 | 12.8 |
| Secondary protein concentrate (%) | 0.40 | 0.47 | 0.53 | 0.58 |
| Starch concentrate (%) | 75.2 | 74.7 | 74.2 | 72.9 |
| Residual (%) | 8.9 | 9.3 | 10.2 | 8.8 |
| Total Fractions (%) | 96.0 | 96.7 | 98.4 | 95.1 |

TABLE 3 — Continued

Comparison of Effects of Sodium Bisulfite, Monothioglycerol and Cysteine on Yield and Composition of Endosperm Fractions from Two-Stage Foam Extraction

| Thiolytic Agent[1] | Control | Na bi-sulfite | Monothio-glycerol | Cysteine-HCl.H$_2$O |
|---|---|---|---|---|
|  |  | 42 ppm | 54 ppm | 80 ppm |
| Nitrogen Yield[3] |  |  |  |  |
| Endosperm (%) | 74.5 | 75.6 | 75.6 | 74.5 |
| Primary protein concentrate (%) | 60.2 | 59.4 | 69.5 | 64.8 |
| Secondary protein concentrate (%) | 1.9 | 2.0 | 2.9 | 2.5 |
| Starch concentrate (%) | 4.8 | 3.5 | 2.5 | 2.5 |
| Residual (%) | 24.7 | 28.8 | 26.4 | 23.5 |
| Total Fractions (%) | 91.6 | 93.7 | 101.3 | 93.3 |
| Composition, dry basis |  |  |  |  |
| Endosperm (%) | 2.67 | 2.69 | 2.69 | 2.67 |
| Primary protein conc. nitrogen (%) | 14.0 | 13.1 | 13.9 | 13.5 |
| Secondary protein conc. nitrogen (%) | 12.2 | 11.6 | 14.5 | 11.4 |
| Starch concentrate nitrogen (%) | 0.17 | 0.13 | 0.09 | 0.07 |
| Residual nitrogen (%) | 7.4 | 8.4 | 7.0 | 7.1 |
| Starch concentrate lipid (%) | 0.02 | 0.09 | 0.08 | 0.08 |
| Starch concentrate ash (%) | 0.17 | 0.18 | 0.16 | 0.16 |

[1]Concentration of thiolytic agent in ppm of endosperm solids. All concentrations are equivalent to 45.6 micromoles per 100 g of endosperm solids.
[2]ml of foam Per g of endosperm feed to primary foam.
[3]% of endosperm solids or nitrogen, except endosperm expressed as % of grain solids or nitrogen.

Figure 7:
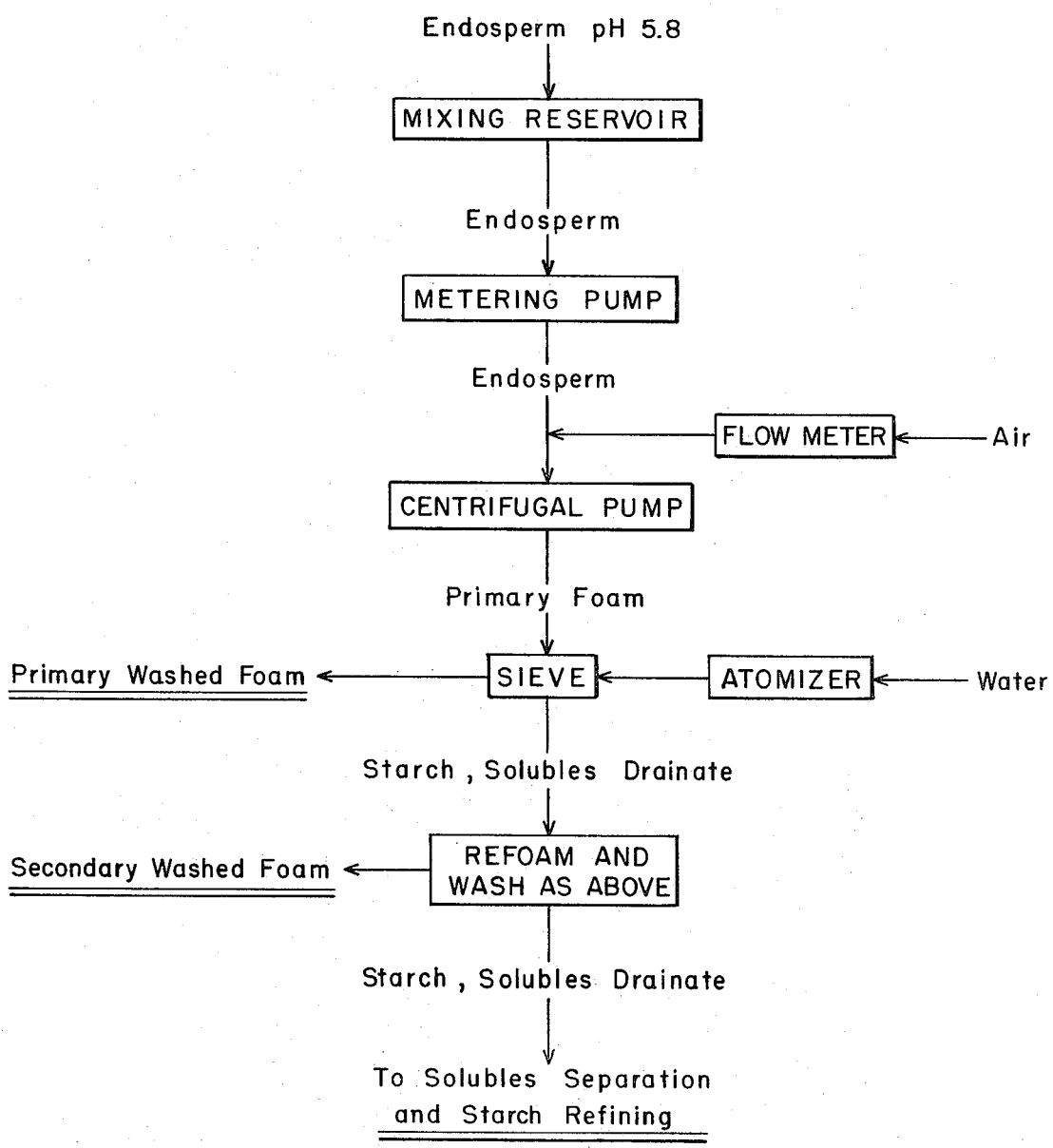
FIG. 7 is a schematic flow diagram illustrating an experimental scale, two-stage foam separation of gluten and starch from hydroprocessed endosperm.

The general procedure for fractionating endosperm is diagrammed in FIG. 7. After adding the above agents, the endosperm extracts at pH 3.0 were adjusted to pH 5.8 with sodium hydroxide in the mixing reservoir. Endosperm was delivered from the mixing reservoir to the foam generator by a metering pump at about 85 ml per minute.

The primary foam generator consisted of a small centrifugal pump into which metered air was injected close to the inlet via a hypodermic needle pierced through a rubber inlet tube. The air flow was about 0.8 ml per gram of endosperm extract. At a speed of 3,000 rpm., the nominal capacity of the pump was about 9.2 gallons per minute of water at a one-foot head. Thus, with endosperm fed at 85 ml per minute, and a negligible output head, the pump was operated in a starved condition whereby the air was intensely mixed with the endosperm to form a finely dispersed emulsion.

The endosperm, charged with emulsified air (primary foam), was pumped to a round pan sieve, 204 mm in diameter with a 250 μm screen, nested on top of an 8 liter stainless steel beaker. Substantially all of the foam, containing entrapped particulate protein and some starch, was retained on the sieve, whereas the liquid phase, containing wheat solubles and suspended starch, drained into the collecting beaker.

After the entire batch of foamed endosperm was delivered to the sieve and drainage had nearly ceased, the volume of the retained foam was estimated by measuring the depth of the layer with a millimeter rule. Microscopic examination of the drained foam revealed a structure of closely packed spherical bubbles generally less than 200 μm in diameter. The interstitial spaces contained liquid in which the starch granules moved freely, whereas movement of the larger protein particles was restrained. Frequently, the pliable protein bodies were seen to be squeezed and flattened between adjacent bubbles.

The primary foam was then washed with 600 ml of distilled water sprayed on the surface from an overhead pneumatic atomizer for a period of about 18 minutes. During washing, the foam was slowly and gently furrowed and turned with a rubber spatula. It has been observed that it is necessary to mobilize the microscopic channels in the interstitial structure of the foam by repeatedly jostling the compacted bubbles. Otherwise little starch is released with the liquid flow. Slow agitation also is important in effecting aggregation of gluten protein into larger particles that resist elution from the foam. Preferably some mobilization should precede washing to minimize leakage of protein during the initial stage of washing.

After draining, the volume of the washed foam was estimated by measuring the depth of the layer. Microscopic examination showed that much of the finely dispersed gluten was aggregated into particles between 500 and 1,000 μm in size. The foam was then transferred quantitatively to an aluminum pan, weighed and freeze dried.

The starch settled in the drainate was resuspended and the entire drainate was refoamed (secondary foam) and washed by the same procedure used in generating and treating the primary foam. Secondary foaming enables recovery of a small amount of finely particulate protein escaped from the primary foam and substantially improves the purity of the starch product.

The starch in the drainate from the secondary foam was settled 18 hours at 3° C. and the supernatant soluble fraction was decanted by vacuum aspiration. The starch was suspended in 200 ml of distilled water and settled for 24 hours at 3° C. The supernatant wash water was decanted and combined with the soluble drainate fraction. The refined starch was freeze dried.

The yields and compositions of the fractions from the variously treated endosperm are shown in Table 3 above.

The following observations are notable:

1. Washing the mobilized foam greatly improved the purity of the gluten protein concentrate over that observed with unwashed foam in Example II. Where the endosperm was foamed at pH 5.8 in Example II, the nitrogen content of the protein concentrate was 6.2 percent, whereas the various treatments in this experiment yielded nitrogen concentrations ranging from 13.1 to 14.0 percent. Correspondingly, the yield of refined starch increased from about 55 percent of the endosperm solids to about 73 to 75 percent.

2. Treating the endosperm with monothioglycerol and cysteine effected 16.2 and 8.0 percent increase in yield of gluten protein nitrogen, respectively, in the combined primary and secondary protein concentrates. These agents also improved the purity of the starch. Relative to the untreated control, monothioglycerol and cysteine reduced the nitrogen content of the starch by 47 and 59 percent, respectively.

3. Monothioglycerol and cysteine enhanced emulsification of air, as indicated by increased volumes of both primary and secondary drained and washed foams. The foams had a distinctly creamier appearance than that of the control.

4. In contrast to the thiol compounds, sodium bisulfite did not affect the foam fractionation significantly. From the similar effects of monothioglycerol and cysteine, it can be anticipated that related thio compounds can be used advantageously.

EXAMPLE IV

This experiment illustrates the effect of varied concentration of cysteine in improving extraction of gluten protein and purity of starch.

A hydroprocessed endosperm extract, containing about 8.6 percent solids, was prepared from a blend of hard red winter and spring wheats. Gluten protein and starch were extracted by the procedure described in Example III, using varied levels of cysteine as indicated in Table 4 below.

TABLE 4

Effect of Cysteine on Yield and Composition of Endosperm Fractions from Two-Stage Foam Extraction

| | Cysteine HCl.H$_2$O[1] (ppm) | | | | | | | | | | |
|---|---|---|---|---|---|---|---|---|---|---|---|
| | 0 | 30 | 40 | 50 | 60 | 80 | 90 | 100 | 0–100 Mean | 0–60 Mean | 80–100 Mean |
| Process | | | | | | | | | | | |
| Endosperm solids conc. (%) | 8.69 | 8.76 | 8.60 | 8.76 | 8.60 | 8.69 | 8.78 | 8.78 | 8.71 | | |
| Primary washed foam solids (%) | 15.6 | 12.7 | 13.6 | 11.9 | 12.0 | 13.4 | 11.0 | 11.6 | 12.7 | 13.2 | 12.0 |
| Secondary washed foam solids (%) | 1.2 | 1.6 | 1.0 | 0.9 | 1.4 | 1.1 | 1.2 | 1.2 | 1.2 | 1.2 | 1.2 |
| Primary drained foam volume (ml/gf)[2] | 0.49 | 0.57 | 0.45 | 0.58 | 0.52 | 0.90 | 0.71 | 0.80 | 0.63 | 0.52 | 0.80 |
| Primary washed foam volume (ml/gf)[2] | 0.29 | 0.43 | 0.34 | 0.43 | 0.38 | 0.63 | 0.51 | 0.66 | 0.46 | 0.37 | 0.60 |
| Secondary drained foam volume (ml/gf)[2] | 0.64 | 1.11 | 1.04 | 0.81 | 1.10 | 1.05 | 1.14 | 1.06 | 0.99 | 0.94 | 1.08 |
| Secondary washed foam volume (ml/gf)[2] | 0.38 | 0.85 | 0.71 | 0.58 | 0.81 | 0.74 | 0.86 | 0.81 | 0.72 | 0.67 | 0.80 |
| Primary washed foam density (g/ml) | 0.22 | 0.19 | 0.22 | 0.20 | 0.22 | 0.13 | 0.19 | 0.16 | 0.19 | 0.21 | 0.16 |
| Secondary washed foam density (g/ml) | 0.12 | 0.07 | 0.07 | 0.07 | 0.06 | 0.06 | 0.07 | 0.07 | 0.07 | 0.08 | 0.07 |
| NaOH/100g solids to pH 5.8[3] (meq) | 12.9 | 13.4 | 11.8 | 12.8 | 12.5 | 12.8 | 12.9 | 13.1 | 12.8 | | |
| Solids Yield[4] | | | | | | | | | | | |
| Endosperm (%) | 77.6 | 78.3 | 76.4 | 78.3 | 76.4 | 77.6 | 78.4 | 78.4 | 77.7 | | |
| Primary protein conc. (%) | 11.5 | 11.9 | 11.6 | 12.0 | 11.5 | 12.8 | 12.2 | 12.6 | 12.0 | 11.7 | 12.5 |
| Secondary protein conc. (%) | 0.40 | 1.15 | 0.60 | 0.42 | 0.79 | 0.58 | 0.75 | 0.76 | 0.68 | 0.67 | 0.70 |
| Starch concentrate (%) | 75.2 | 74.3 | 74.5 | 73.4 | 74.5 | 72.9 | 74.3 | 73.9 | 74.1 | 74.4 | 73.7 |
| Residual (%) | 8.9 | 8.9 | 9.0 | 9.7 | 9.9 | 8.8 | 10.2 | 9.7 | 9.4 | 9.3 | 9.6 |
| Total Fractions (%) | 96.0 | 96.3 | 95.9 | 95.5 | 96.7 | 95.1 | 97.5 | 97.0 | 96.3 | 96.0 | 96.5 |
| Nitrogen Yield[4] | | | | | | | | | | | |
| Endosperm (%) | 74.5 | 75.2 | 71.5 | 75.2 | 70.6 | 74.5 | 69.9 | 69.9 | 72.7 | | |
| Primary protein conc. (%) | 60.2 | 60.7 | 62.5 | 65.3 | 60.9 | 64.8 | 68.8 | 66.3 | 63.7 | 61.9 | 66.6 |
| Secondary protein conc. (%) | 1.9 | 2.4 | 2.2 | 2.7 | 2.8 | 2.5 | 3.1 | 3.3 | 2.6 | 2.4 | 3.0 |
| Total protein conc. (%) | 62.3 | 63.1 | 64.7 | 68.0 | 63.7 | 67.3 | 71.9 | 69.6 | 66.3 | 64.4 | 69.6 |
| Starch concentrate (%) | 4.8 | 2.5 | 3.6 | 3.4 | 3.2 | 2.5 | 2.5 | 2.2 | 3.1 | 3.5 | 2.4 |
| Residual (%) | 24.7 | 18.7 | 22.7 | 20.2 | 24.8 | 23.5 | 19.8 | 19.9 | 21.8 | 22.2 | 21.1 |
| Total Fractions (%) | 91.6 | 85.9 | 91.0 | 90.6 | 91.7 | 93.3 | 94.2 | 91.7 | 91.3 | 90.2 | 93.1 |
| Composition, dry basis | | | | | | | | | | | |
| Endosperm nitrogen (%) | 2.67 | 2.67 | 2.60 | 2.67 | 2.60 | 2.67 | 2.48 | 2.48 | 2.61 | | |
| Primary protein conc. nitrogen (%) | 14.0 | 13.7 | 14.0 | 14.5 | 13.8 | 13.5 | 14.0 | 13.1 | 13.8 | 14.0 | 13.5 |
| Secondary protein conc. nitrogen (%) | 12.2 | 9.4 | 9.3 | 10.8 | 9.2 | 11.4 | 10.2 | 10.9 | 10.4 | 10.2 | 10.8 |
| Starch conc. nitrogen (%) | 0.17 | 0.09 | 0.13 | 0.12 | 0.11 | 0.07 | 0.08 | 0.06 | 0.10 | 0.12 | 0.07 |
| Residual nitrogen (%) | 7.4 | 5.6 | 6.4 | 5.5 | 6.6 | 7.1 | 4.9 | 5.1 | 6.1 | 6.3 | 5.7 |
| Starch conc. lipid (%) | 0.02 | 0.09 | 0.02 | 0.23 | 0.01 | 0.08 | 0.19 | 0.08 | 0.09 | | |
| Starch conc. ash (%) | 0.17 | 0.21 | 0.17 | 0.33 | 0.16 | 0.16 | 0.17 | 0.18 | 0.21 | | |

[1] ppm of endosperm solids.
[2] ml of foam per g of endosperm feed to primary foam.
[3] NaOH to adjust endosperm extract from pH 3.00 – 3.09.
[4] % of endosperm solids or nitrogen, except endosperm—% of grain solids As shown in Table 4, cysteine significantly improved the yield of gluten protein and purity of starch. In the range of 80 to 100 ppm, the total yield of gluten nitrogen in the primary and secondary foams averaged about 70 percent of the endosperm nitrogen as compared to an average of 64 percent at all lower concentrations and 62 percent in the absence of cysteine. Correspondingly, 80 to 100 ppm cysteine reduced the average level of nitrogenous impurities in the starch to about 58 percent of the average present at all lower concentrations.

Cysteine enhanced emulsification of air, as measured by volume of primary drained foam, in a manner closely paralleling the increase in yield of gluten and purity of starch.

ter and spring wheats, containing 11.7 percent solids at pH 5.8, was foamed by vortex entrainment of air, as described in Example II. The size of the bubbles was measured by microscopic examination of a sample of foam volumetrically diluted 1:10 in a Sedgewick-Rafter slide chamber. 0.1 percent Carbopol No. 961 (Goodrich Chemical Co.) was used as a pseudoplastic diluting medium. This medium provides fluidity during mixing but immobilizes the bubbles in the resting dispersion. 60 bubbles were measured with an ocular reticle at 100× magnification, using a mechanical system for randomizing selection of bubbles. The measurement was repeated at intervals through 169 minutes.

A statistical characterization of the distribution of size of bubbles is shown in Table 5.

TABLE 5

Bubble Size Distribution in Vortex-Generated Foam

| Bubble Age[1] | Bubble Diameter | | | | | | | |
|---|---|---|---|---|---|---|---|---|
| | Mean | Median[2] | 10–90 Percentile[2] | Mean ±1.28SD[3] | Range | Standard Deviation | | Standard Error |
| minutes | $\mu$m | $\mu$m | $\mu$m | $\mu$m | $\mu$m | $\mu$m | % | % |
| 10 | 102 | 92 | 62–150 | 51–153 | 40–210 | 40 | 39 | 4.7 |
| 25 | 119 | 114 | 62–182 | 52–186 | 35–350 | 52 | 44 | 5.7 |
| 43 | 134 | 128 | 60–196 | 60–208 | 35–360 | 58 | 43 | 5.6 |
| 55 | 127 | 128 | 63–175 | 72–182 | 35–225 | 43 | 34 | 4.4 |
| 130 | 178 | 155 | 87–263 | 63–293 | 40–650 | 90 | 50 | 6.5 |
| 142 | 190 | 163 | 100–290 | 79–301 | 65–380 | 87 | 46 | 5.9 |
| 159 | 186 | 169 | 106–271 | 107–265 | 90–330 | 62 | 33 | 4.3 |
| 169 | 173 | 169 | 98–245 | 103–243 | 50–300 | 55 | 33 | 5.8 |

[1]Mean age of chamber dispersion during period of count.
[2]Interpolated from visually fitted distribution curves.
[3]Equivalent to 10 - 90 percentile if the distribution were normal.

These data show some variations in trend which can be expected. Both atmospheric oxygen and cysteine can participate in the oxidation-reduction reactions involving the sulfhydryl and disulfide structure of a protein and cysteine can be directly oxidized by oxygen. Thus, the aerated reaction system is complex and minor differences in experimental conditions and timing can cause variation.

In general, cysteine can be used advantageously in concentration ranging from about 40 to about 120 ppm. On a molecular basis, cysteine and related thiol compounds are generally useful at levels providing about 20 to 70 microequivalents of sulfhydryl groups per 100 grams of endosperm solids. In this context, the terms sulfhydryl, thiol and mercapto groups are used synonomously.

EXAMPLE V

The effectiveness of the emulsion type foam in selectively filtering gluten from starch relates to the distribution of size of bubbles. This distribution influences the manner of packing of bubbles in the foam and the resulting size of the interstitial spaces relative to the size and mobility of starch granules and protein particles. The following experiment illustrates a typical bubble size distribution characteristic of the process.

An endosperm extract from a blend of hard red win-

A notable feature of these data is that the bubble size increases with time. This is due to diffusive transfer of gas from small to large bubbles with the result that small bubbles shrink and disappear and large bubbles expand. Thus, while the number of bubbles in the foam decreases, the total volume of the bubbles tends to remain constant.

The gas pressure within a bubble due to surface tension varies inversely with the radius of the bubble, according to the relation $p = 4T/r$, where $P$ is pressure in dynes/cm$^2$, $T$ is surface tension in dynes/cm and $r$ is radius in cm. Thus, gas diffuses from a small bubble at relatively high pressure through the aqueous phase to a larger bubble at lower pressure.

For example, a relatively large bubble, initially measuring 193 $\mu$m, increased to 208 $\mu$m in 60 minutes. A 156 $\mu$m bubble decreased to 152 $\mu$m in the same time, but a 28 $\mu$m bubble disappeared in 1 minute. The lifetime of bubbles less than 40 $\mu$m is quite short. Thus, although formed continuously, they are rarely encountered in a random selection for measurement.

It is evident that the rate and direction of change in size of a given bubble at a point in time is affected by the size distribution of all other bubbles in the population and ultimately by the distribution in the gaseous emulsion initially generated. The overall impact of this is seen in discontinuities in rate of change in the mean and median values in Table 5. The decrease in average size and leveling of the median size between 142 and 169 minutes can be attributed to the eventual dominance of a low pressure sink in the slide chamber in the form of a small unfilled void at one end of the chamber.

The change in size illustrated here in a dilute dispersion of immobilized bubbles occurs much slower than in a functioning bed of closely compacted bubbles where diffusion of gas is faster. Since bubble volume is a cube function of the diameter, the change in foam structure with time is predominantly a disappearance of small bubbles nestled in the interstices between the initial large bubble component of the population.

This evolution of bubble size plays an important role in the selective filtration of particulate protein from starch. During initial fast drainage of water from the foam, the close packing and fine interstitial structure afforded by small bubbles prevents the protein particles and part of the starch from being swept through. As the foam is mobilized and protein is aggregated into larger particles, the increase in size of interstitial spaces accompanying disappearance of small bubbles releases the remaining starch while the foam is washed, and the protein particles are effectively retained.

These and other observations generally characterize a desirable gaseous emulsion, as initially generated, as containing bubbles predominantly less than about 1,000 $\mu$m in diameter with at least 80 percent less than about 500 $\mu$m and preferably less than about 300 $\mu$m. Bubbles larger than 1,000 $\mu$m are generally undesirable in that they contribute inefficiently to the fine interstitial structure of the filtration medium. They also constitute a low pressure gaseous sink which modifies the course of change in size of bubbles in the rest of the population.

EXAMPLE VI

Selective separation of starch and protein particles by filtration through the interstitial channels of a foam matrix depends on their relative size. Wheat starch granules typically range between 1 and 35 to rarely 50 $\mu$m in overall dimension. Although granules less than 15 $\mu$m comprise around 87 percent by number, around 93 percent by weight is distributed in granules 15 $\mu$m and larger. The following experiment characterizes the size of particles of gluten protein as derived in the hydroprocessed endosperm and modified by foaming, draining and washing.

The vortex-generated foam described in Example V was drained and transferred to a 250 $\mu$m sieve, where it was washed with distilled water, as described in Example III. 0.01 ml samples of unfoamed endosperm, drained foam and washed foam were collected with a loop and transferred to a microscope slide. The samples were gently mixed with 0.06 ml of water and 0.01 ml of 0.1 percent aqueous solution fast green stain and covered with a cover slip. The size of the stained protein particles was measured at 100× magnification with an ocular reticle. The particles were selected randomly by a mechanical system. The size was estimated as the interval in the reticle scale subtended by vertical lines intercepting the extreme edges of each randomly oriented particle. Although the particles were somewhat irregular in shape, they tended to be mostly rounded, with the maximum dimension rarely more than twice the minimum dimension. The particle size distribution thus expressed in terms of randomly measured dimension represents an average not differing importantly from the dimensional pattern of an irregular particle.

As shown in Table 6 below, the protein particles in the endosperm before foaming averaged 105 $\mu$m in random dimension, with 80 percent in the range 28 to 192 $\mu$m. However, due to the intense agitation during foaming, the size was reduced about one-half in the drained foam. When the bubble structure was mobilized and jostled by gentle mixing prior to and during washing, the protein particles were aggregated to a mean size of 150 $\mu$m with 80 percent ranging between 35 and 300 $\mu$m and with a total range of 25 to 1,550 $\mu$m. The impact of aggregation is better appreciated with recognition that, although their frequency was low, particles over 500 $\mu$m accounted for a large proportion of the total mass of protein.

TABLE 6

Distribution of Protein Size at Various Phase of Foam Filtration

| Phase | Particle Size | | | | | | | |
|---|---|---|---|---|---|---|---|---|
| | Mean | Median[1] | 10-90 Percentile[1] | Mean ±1.28SD[2] | Range | Standard Deviation | | Standard Error |
| | $\mu$m | $\mu$m | $\mu$m | $\mu$m | $\mu$m | $\mu$m | % | % |
| Endosperm | 105 | 87 | 28-192 | 14-196 | 10-430 | 71 | 68 | 6.8 |
| Drained foam | 53 | 45 | 17-90 | 16-90 | 10-135 | 29 | 54 | 5.5 |
| Washed foam | 150 | 72 | 35-300 | -169-469 | 25-1550 | 240 | 166 | 17.0 |

[1]Interpolated from visually fitted distribution curves.
[2]Equivalent to 10-90 percentile if the distribution were normal.

The relative mass of protein represented by a size class in the particle size distribution can be estimated from the distribution of cumulative volume indexed as the cube of the randomly measured particle dimensions. From the data on which the summary in Table 6 was based, the proportion of the total mass of protein represented by particles larger than 35 $\mu$m (the size of large starch granules) in the endosperm before foaming, drained foam and washed foam was 99.9, 97.9 and 99.9 percent, respectively. However, the proportion in particles larger than 70 $\mu$m (twice the size of large starch granules) was 99.2, 71.7 and 99.9 percent, respectively; and the proportion in particles larger than 140 $\mu$m was 85.0, 0.0 and 99.6 percent, respectively. In the washed foam, about 95 percent of the protein mass was accounted in particles over 500 $\mu$m in random dimension, even though such particles represented only about 5 percent of the total population.

It is thus seen that degradation of size of protein particles by attrition during emulsification of air in the endosperm effects a marginal differential in size of protein and starch particles. Mobilization of the drained foam prior to and during washing to cause aggregation of protein plays an important role in the selective filtration.

EXAMPLE VII

This example further characterizes endosperm foams used in selective filtration of protein from starch.

From FIG. 6, it is seen that the specific volume of the gaseous emulsion generated by vortex entrainment of air in endosperm containing 4.1 percent solids at pH 3.8 to 5.8 ranged from 1.48 to 1.75 ml/g of endosperm extract. The yield of foam drained for 30 minutes ranged from 0.62 to 0.88 ml/g of endosperm extract.

The yield of primary drained foam from an endosperm containing about 8.7 percent solids at pH 5.8 and foamed by entrainment of air in a centrifugal pump ranged from 0.59 to 0.90 ml/g of endosperm extract (Table 3).

In a pilot plant operation, where an endosperm extract containing 17.0 percent solids at pH 4.8 was foamed by dispersion of air in an Oakes mixer, the specific volume of the gaseous emulsion was 1.66 ml/g of endosperm extract and the yield of drained foam was 0.66 ml/g of endosperm extract. Good separation of gluten protein from starch and solubles was obtained.

In general, useful separation of gluten protein from starch can be obtained where the specific volume of the gaseous emulsion ranges between 1.3 and 2.0 ml/g of endosperm extract and the yield of drained foam is about 0.35 to 1.0 ml/g of endosperm extract. Generally the yield of gluten protein and purity of starch is best where the yield of drained foam is above about 0.55 ml/g of endosperm extract.

What is claimed is:

1. A process of separating starch and gluten components of wheat endosperm obtained by a hydroprocessing method wherein the normal cellular structure of the endosperm is substantially completely disrupted and during which the endosperm is dispersed in an aqueous medium, the starch granules are maintained in a substantially intact and ungelatinized form and the gluten protein is dispersed and wherein the husks are removed from said product; the endosperm comprising wheat starch granules which are substantially intact, ungelatinized and unoccluded by gluten protein; homogeneous, smoothly contoured gluten protein particles containing only minor amounts of occluded starch, said gluten protein being substantially undenatured with respect to doughing function; said process comprising the steps of:
   a. providing an aqueous dispersion comprising said wheat starch granules, said gluten protein particles and wheat solubles having a pH between 3.8 and 6.5;
   b. incorporating gas into said aqueous dispersion to create a gas emulsion wherein the gas bubbles are spherical and are predominantly less than 1,000 microns in diameter;
   c. allowing said gas emulsion to consolidate into a top layer of foam, comprising particles of gluten protein and some starch granules entrapped in the interstices of compacted spherical bubbles, and a bottom layer, comprising starch granules suspended in an aqueous solution of wheat solubles; and,
   d. separating said foam layer containing gluten protein from said dispersion of starch and solubles.

2. The process of claim 1 wherein, prior to separating said consolidated foam layer from said bottom layer, said foam layer is washed while being gently agitated to effect selective elution of starch and solubles into said bottom layer.

3. The process of claim 2 wherein prior to washing said foam layer as described in claim 2, said foam layer is gently agitated to cause aggregation of particles of gluten protein.

4. The process of claim 3 wherein said aqueous dispersion contains from 4 to 26 percent by weight of wheat solids.

5. The process of claim 4 wherein at least 90 percent by weight of the gluten protein particles in said aqueous dispersion, step a, are more than 50 microns in randomly measured dimension.

6. The process of claim 5 wherein the pH of said aqueous dispersion is from 4.2 to 5.0.

7. The process of claim 6 wherein the solids content of said aqueous dispersion is between 8 and 18 percent.

8. The process of claim 7 wherein an oxidizing agent is added to said aqueous dispersion prior to incorporating gas therein, said oxidizing agent being selected from the group consisting of potassium bromate, potassium iodate, potassium persulfate, hydrogen peroxide, acetone peroxide, azodicarbonamide, dihydro-L-ascorbic acid, chlorine dioxide and oxygen.

9. The process of claim 5 wherein gas is incorporated into said aqueous dispersion by means sufficient to create gas bubbles predominantly less than 1,000 microns in diameter.

10. The process of claim 9 wherein the bubbles in said gas emulsion are predominantly less than 300 microns in diameter.

11. The process of claim 10 wherein the specific volume of said gas emulsion ranges from 1.3 to about 2.0 ml per gram of endosperm dispersion.

12. The process of claim 1 wherein said foam layer contains 30% to 40% protein on a dry basis.

13. The process of claim 9 wherein a thiolytic agent is added to said endosperm dispersion prior to incorporating gas therein to provide equivalent concentrations of reactive sulfhydryl group ranging from about 10 to about 75 microequivalents per 100 grams of endosperm solids, said thiolytic agent being selected from glutathione and the group of compounds containing two to six linearly linked carbon atoms, bearing at least one substituent sulfhydryl group and at least one substituent selected from the group consisting of hydrogen, hydroxyl, carboxyl and amino.

14. The process of claim 13 wherein the thiolytic agent is selected from the group consisting of cysteine and the soluble salts of cysteine.

15. The process of claim 13 wherein the thiolytic agent is alpha monothioglycerol.

16. A process of separating starch and gluten components of wheat endosperm comprising the steps of:
   a. obtaining an aqueous dispersion comprising starch, gluten protein and wheat solubles by hydroprocess, said process comprising the steps of:
      i. steeping 1 part by weight of wheat in at least 1.5 parts by weight of an aqueous acid steeping medium at a temperature ranging from about 18° C. to about 45° C. until the wheat has sorbed steeping medium equivalent to about 56 to about 95 percent by weight of the wheat, said steeping medium containing acid in concentration and quantity sufficient to maintain the pH of said steeping medium external of the wheat between 0.8 and 2.5 and to reduce the internal pH of the hydrated wheat to between 2.5 and 4.0;

ii. macerating the hydrated wheat to split the husk and expose the endosperm as a plastic mass while maintaining at least 90 percent by weight of the husk and the germ above a minimum dimension of 300 microns;

iii. dispersing the macerated wheat in an aqueous dispersing medium to a solids concentration of from about 4 to about 26 percent and maintaining the pH of said dispersion between about 2.4 and about 3.4; the dispersing shear being sufficient to disengage the endosperm from the husk and the germ tissues;

iv. separating said dispersion into a particulate husk and germ fraction and an endosperm dispersion;

v. while maintaining throughout the process substantially all of the starch granules in an intact, ungelatinized form and maintaining substantially all of the gluten protein in a dispersible and substantially undenatured state with respect to doughing function.

vi. adjusting the pH to between 3.8 and 6.5 b. incorporating gas into said aqueous dispersion to create a gas emulsion wherein the gas bubbles are spherical and are predominantly less than 1000 microns in diameter;

c. allowing said gas emulsion to consolidate into a top layer of foam, comprising particles of gluten protein and some starch granules entrapped in the interstices of compacted spherical bubbles, and a bottom layer, comprising starch granules suspended in an aqueous solution of wheat solubles;

d. separating said foam layer containing gluten protein from said dispersion of starch and solubles.

17. The process of claim 16 wherein, prior to separating said consolidated foam layer from said bottom layer, said foam layer is washed while being gently agitated to effect selective elution of starch and solubles into said bottom layer.

18. The process of claim 17 wherein prior to washing said foam layer, said foam layer is gently agitated to cause aggregation of particles of gluten protein.

19. The process of claim 18 wherein said aqueous dispersion contains from 4 to 26 percent by weight of wheat solids.

20. The process of claim 19 wherein at least 90 percent by weight of the gluten protein particles in the initial aqueous dispersion are more than 50 microns in randomly measured dimension.

21. The process of claim 20 wherein the bubbles in said gas emulsion are predominantly less than 300 microns in diameter.

22. The process of claim 21 wherein the specific volume of said gas emulsion ranges from 1.3 to about 2.0 ml per gram of endosperm dispersion.

* * * * *